US007996326B2

(12) United States Patent
Kurasaki et al.

(10) Patent No.: US 7,996,326 B2
(45) Date of Patent: Aug. 9, 2011

(54) FINANCIAL CARD SYSTEM, COMMUNICATIONS DEVICE, AUTHENTICATION TERMINAL, AUTHENTICATION METHOD, AND PROGRAM

(75) Inventors: Toshiya Kurasaki, Tokyo (JP); Hideaki Kihara, Tokyo (JP)

(73) Assignee: Felica Networks, Inc., Tokyo (JP)

( * ) Notice: Subject to any disclaimer, the term of this patent is extended or adjusted under 35 U.S.C. 154(b) by 0 days.

(21) Appl. No.: 11/823,226

(22) Filed: Jun. 27, 2007

(65) Prior Publication Data
US 2008/0016004 A1  Jan. 17, 2008

(30) Foreign Application Priority Data

Jun. 29, 2006 (JP) ................. 2006-180430

(51) Int. Cl.
  *G06Q 20/00* (2006.01)
  *G06F 21/00* (2006.01)
(52) U.S. Cl. ........... 705/67; 705/71; 705/75; 705/76; 902/2; 902/4; 902/25; 902/26; 902/40
(58) Field of Classification Search .......... 705/67, 705/71, 75, 76; 902/2, 4, 25, 26, 40
See application file for complete search history.

(56) References Cited

U.S. PATENT DOCUMENTS

| | | | | |
|---|---|---|---|---|
| 5,677,954 A | * | 10/1997 | Hirata et al. | 380/257 |
| 5,834,747 A | * | 11/1998 | Cooper | 235/449 |
| 6,631,849 B2 | * | 10/2003 | Blossom | 235/492 |
| 2004/0068631 A1 | * | 4/2004 | Ukeda et al. | 711/163 |
| 2004/0133787 A1 | * | 7/2004 | Doughty et al. | 713/186 |
| 2006/0161789 A1 | * | 7/2006 | Doughty et al. | 713/186 |

FOREIGN PATENT DOCUMENTS

| | | |
|---|---|---|
| JP | 7 334590 | 12/1995 |
| JP | 2004 234633 | 8/2004 |

OTHER PUBLICATIONS

IEEE 100 The Authoritative Dictionary of IEEE Standards Terms, Seventh Edition. IEEE Press, 2000. Front matter, first two pages of K section included.*
Handbook of Applied Cryptography. Menezes, Alfred J et al. CRC Press, 1996. ISBN 0-8493-8523-7.*
How Computers Work, Millennium Edition. White, Ron. Que Publishing, Indianapolis, 1999. ISBN 0-7897-2112-0. Chapters 1-9, 14-31 included.*

* cited by examiner

*Primary Examiner* — Andrew J. Fischer
*Assistant Examiner* — Christopher C. Johns
(74) *Attorney, Agent, or Firm* — Frommer Lawrence & Haug LLP; William S. Frommer; Thomas F. Presson

(57) ABSTRACT

Disclosed herein is a financial card system. The system includes a communications device on which a non-contact integrated circuit chip is installed; and an authentication terminal having a reader/writer allowing reading/writing information on the communications device and capable of transmission and reception of information with the communications device through the reader/writer. The communications device has a storage block, a common area information transmission block, and an individual area information transmission block. The reader/writer of the authentication terminal has a storage block, a common area information reception block, and an individual area information reception block.

3 Claims, 11 Drawing Sheets

| INDEX AREA |
|---|
| IC CHIP CODE |
| AREA CODE FA1 |
| AREA CODE FA2 |
| AREA CODE FA3 |
| KEY VALUE 1 |
| KEY VALUE 2 |
| KEY VALUE 3 |
| ENCRYPTION TYPE CODE |

| FINANCIAL CARD AREA (1) | |
|---|---|
| CARD COMMOM INFORMATION 1 | AUTHENTICATION NOT REQUIRED |
| CARD COMMOM INFORMATION 2 | |
| CARD DATA 1 | AUTHENTICATION REQUIRED |
| CARD DATA 2 | |

FIG. 13

| NUMBER OF ALLIED FINANCIAL ORGANIZATIONS (1) | RESEARCH TIME FOR 32 ORGANIZATIONS (2) | NUMBER OF TIMES EACH OF 32 ORGANIZATIONS IS RESEARCHED (3) | REMAINDER (1) - (3) x 32 | RESEARCH TIME OF REMAINDER (5) | SEARCH TIME (GENERATION CONFIGURATION) (2) + (5) |
|---|---|---|---|---|---|
| 100 | 85.8 | 3 | 4 | 18.1 | 275.4 |
| 200 | 85.8 | 6 | 8 | 27.8 | 542.4 |
| 300 | 85.8 | 9 | 12 | 37.4 | 809.4 |
| 400 | 85.8 | 12 | 16 | 47.1 | 1,076.3 |
| 500 | 85.8 | 15 | 20 | 56.8 | 1,343.3 |
| 600 | 85.8 | 18 | 24 | 66.4 | 1,610.3 |
| 700 | 85.8 | 21 | 28 | 76.1 | 1,877.2 |
| 800 | 85.8 | 25 | 0 | 8.5 | 2,152.7 |
| 900 | 85.8 | 28 | 4 | 18.1 | 2,419.6 |
| 1,000 | 85.8 | 31 | 8 | 27.8 | 2,686.6 |
| 1,100 | 85.8 | 34 | 12 | 37.4 | 2,953.6 |
| 1,200 | 85.8 | 37 | 16 | 47.1 | 3,220.5 |
| 1,300 | 85.8 | 40 | 20 | 56.8 | 3,487.5 |
| 1,400 | 85.8 | 43 | 24 | 66.4 | 3,754.5 |
| 1,500 | 85.8 | 46 | 28 | 76.1 | 4,021.4 |
| 1,600 | 85.8 | 50 | 0 | 8.5 | 4,296.9 |
| 1,700 | 85.8 | 53 | 4 | 18.1 | 4,563.8 |
| 1,800 | 85.8 | 56 | 8 | 27.8 | 4,830.8 |
| 1,900 | 85.8 | 59 | 12 | 37.4 | 5,097.8 |
| 2,000 | 85.8 | 62 | 16 | 47.1 | 5,364.7 |

(UNIT IN ms)

FINANCIAL CARD SYSTEM, COMMUNICATIONS DEVICE, AUTHENTICATION TERMINAL, AUTHENTICATION METHOD, AND PROGRAM

CROSS REFERENCES TO RELATED APPLICATIONS

The present invention contains subject matter related to Japanese Patent Application JP 2006-180430 filed in the Japan Patent Office on Jun. 29, 2006, the entire contents of which being incorporated herein by reference.

BACKGROUND OF THE INVENTION

1. Field of the Invention

The present invention relates to a financial card system, a communications device, a authentication terminal, an authentication method, and a program.

2. Description of the Related Art

Recently, the use of portable terminals and so on incorporating a non-contact IC (Integrated Circuit) chip has been proposed also in the ATM (Automatic Teller Machine) services provided by financial organizations. In this proposal, the non-contact IC chip comes to hold individual items of information (hereafter referred to as financial card information) that have been recorded to financial cards issued by financial organizations. In the case of cash cards, the personal information includes financial organization number, branch number, account number, account type, card owner name, balance in account, and so on, for example. In addition to cash cards, the financial cards include loan cards and credit cards, for example. The security of these items of financial card information must be strictly protected in the nature of things. Therefore, financial transactions based on the non-contact IC chip require technologies for securely managing the financial card information by use of encryption keys. So far, information security technologies have been made public (as disclosed in Japanese Patent Laid-open No. 2004-234633, for example), including one in which tallies (equivalent to encryption keys) that are divided between the non-contact IC chip and a server are matched for authentication.

In general, methods of managing financial card information based on encryption keys require to hold an encryption key for reading financial card information in each reader/writer for non-contact IC chips. Also, the encryption keys stored in the reader/writer are distributed to each reader/writer or each ATM terminal connected thereto, via a network from a host computer managed by a financial organization for example. This network may be either a communication path based on a leased line or a communication path based on a general line. Obviously, the distribution of encryption keys through a network involves a risk of wiretapping and falsification.

It should be noted that each non-contact IC chip can store two or more items of financial card information (refer to Japanese Patent Laid-open No. Hei 7-334590, for example). For example, the financial card information may include the cash card information, loan card information, and credit card information of each financial organization. While each non-contact IC chip can collectively store and manage a plurality of items of financial card information, it is required for each non-contact IC chip to set an individual encryption key to each item of financial card information for secure management. Therefore, the reader/writer must hold an individual encryption key corresponding to each item of financial card information that can be handled and, at the same time, when accessing predetermined financial card information recorded to each non-contact IC chip, read that financial card information by use of the corresponding encryption key.

SUMMARY OF THE INVENTION

The number of types of financial card information to be handled by ATM terminals of financial organizations may normally exceed several thousands. In this situation, the encryption keys corresponding to these various types of financial card information must be held on the reader/writer side and the provision of services by use of these large number of encryption keys involves various technical difficulties. For example, searching for the financial card information available at a particular ATM terminal from the financial card information registered in a non-contact IC chip requires that ATM terminal makes a match between the encryption key held in that ATM terminal and the encryption key recorded to that non-contact IC chip for executing authentication. The time for this authentication processing is at least several seconds considering the current general processing speed between the non-contact IC chip and the ATM terminal. This relatively long time necessary for the authentication processing would not only severely impair the convenience of each user but also other users in line.

In addition, when registering financial organizations, the host computer of a financial organization that manages ATM terminals must, via a network, securely distribute the encryption key corresponding to the financial card information of each financial organization to tens of thousands of ATM terminals all over the country. However, it is statistically shown that current related technologies cause about 1% distribution errors of all ATM terminals. Hence, the host computer must repeat transmission on those ATM terminals having a distribution error or service personnel must be dispatched to such ATM terminals. These errors create problems of the delayed provision of services at some of the ATM terminals and problems of excess maintenance and management cost, for example.

Therefore, the present invention addresses and solves the addressed and related problems by providing a financial card system, a communications device, an authentication terminal, an authentication method, and a program that are capable of eliminating the necessity for a host computer to distribute encryption keys online and shortening the time necessary for authentication processing.

In carrying out the invention and according to one embodiment thereof, there is provided a financial card system. This system has a communications device on which a non-contact IC chip is installed and an authentication terminal having a reader/writer allowing reading/writing information on the communications device and capable of transmission and reception of information with the communications device through the reader/writer. The communications device has a storage block having an individual area to which financial card information is recorded for each financial organization and which is accessible by use of an individual encryption key unique to the each financial organization and a common area accessible by use of a common encryption key which is recorded the individual encryption key for the each financial organization and is recorded to the reader/writer; The communications device has a common area information transmission block configured to transmit the individual encryption key from the common area to the reader/writer when the common area is accessed by the reader/writer by use of the common encryption key; The communications device has an individual area information transmission block configured to transmit the financial card information from the individual area to the reader/writer when the individual area is accessed by the reader/writer by use of the individual encryption key. The reader/writer of the authentication terminal has a storage block to which the common encryption key for use in accessing the common area in the storage block of the communications device is recorded; The reader/writer of the authentication terminal has a common area information reception block configured to receive the individual encryption key from the common area by accessing the common area of the storage block of the communications device by use of the common encryption key; The reader/writer of the authentication terminal has an individual area information reception block configured to receive the financial card information from the individual area by accessing the individual area of the storage block of the communications device by use of the received individual encryption key.

The above-mentioned financial card system has a communications device on which a non-contact IC chip is installed and an authentication terminal having a reader/writer capable of transmitting and receiving information on the communications device to transmit and receive information with the communications device through the reader/writer. In addition, of a memory area, the a storage block of the communications device has an individual area to which financial card information is recorded for each financial organization and which is accessible by use of an individual encryption key unique to each financial organization and a common area to which an individual encryption key is recorded for each financial organization and which is accessible by use of a common encryption key recorded to the reader/writer. Further, the common area transmission block of the above-mentioned communications device transmits the individual encryption key from the common area to the reader/writer when the common area is accessed by the reader/writer by use of the common encryption key. The individual area information transmission block of the communication device transmits the financial card information from the individual area to the reader/writer when the individual area is accessed by the reader/writer by use of the individual encryption key. The storage block of the above-mentioned reader/writer stores a common key for use in accessing the common area in the storage block of the communications device. The common area information reception block of the reader/writer receives the individual encryption key from the common area by accessing the common area in the storage block of the communications device by use of the common encryption key. The individual area information reception block of the reader/writer receives the financial card information from the individual area by accessing the individual area in the storage block of the communications device by use of the received individual encryption key. This novel configuration can restrict the encryption key to be held in the authentication terminal only to the common encryption key, thereby eliminating the necessity for online distributing encryption keys from the host computer and reducing the time necessary for authentication processing.

The above-mentioned storage block of the communications device may have an individual area to which financial card information is recorded for each financial card registered by a user and which is accessible by use of an individual encryption key unique to the each financial card instead of the individual area to which financial card information is recorded for each financial organization and which is accessible by use of an individual encryption key unique to the each financial organization. This configuration allows the provision of security for each item of financial card information, thereby restricting the damage inflicted by the leakage of an individual encryption key, if any, only to the affected financial card information.

In carrying out the invention and according to another embodiment thereof, there is provided a communications device capable of transmitting and receiving information with a non-contact IC chip reader/writer. This communications device has a storage block having, of a memory area, an individual area to which financial card information is recorded for each financial organization and which is accessible by use of an individual encryption key unique to the each financial organization and a common area to which an individual encryption for the each financial organization is recorded and which is accessible by use of a common encryption key recorded to the non-contact integrated circuit chip reader/writer; This communications device has a common area information transmission block configured to transmit the individual encryption key from the common area to the non-contact integrated circuit chip reader/writer when the common area is accessed by the non-contact integrated circuit chip reader/writer by use of the common encryption key; This communications device has an individual area information transmission block configured to transmit the financial card information from the individual area to the integrated circuit chip reader/writer when the individual area is accessed by the non-contact integrated circuit chip reader/writer by use of the individual encryption key.

The storage block of the above-mentioned communications device has, of the memory area, the individual area to which financial card information is recorded for each financial organization and which is accessible by use of the individual encryption key unique to each financial organization and the common area to which the individual encryption key for each financial organization is recorded and which is accessible by use of the common encryption key recorded to the reader/writer. The above-mentioned common area information transmission block transmits the individual encryption key from the common area to the reader/writer when accessed by the reader/writer by use of the common encryption key. The above-mentioned individual area information transmission block transmits the financial card information from the individual area to the reader/writer when accessed by the reader/writer by use of the individual encryption key. This novel configuration restricts the necessary encryption keys held in the authentication terminal only to the common encryption key, thereby making it unnecessary for the host computer to distribute encryption keys online, which reduces the risk of interception of encryption keys.

The above-mentioned storage block of the above-mentioned communications device may has an individual area to which financial card information is recorded for each financial card registered by a user and which is accessible by use of an individual encryption key unique to the each financial card instead of the individual area to which financial card information is recorded for each financial organization and which is accessible by use of an individual encryption key unique to the each financial organization. This novel configuration allows the provision of security for each item of financial card information, thereby restricting the damage inflicted by the leakage of an individual encryption key, if any, only to the affected financial card information.

In carrying out the invention and according to still another embodiment thereof, there is provided an authentication terminal. This authentication terminal has a non-contact IC chip reader/writer capable of transmitting and receiving information with a communications device. The communication device includes a storage block having an individual area to which financial card information is recorded for each financial organization and a common area to which a common encryption key for accessing the individual area is recorded. The non-contact integrated circuit chip reader/writer of the authentication terminal has a storage block in which a common encryption key necessary for accessing the common area, of a memory area of the storage block of the communications device; This authentication terminal has a common area information reception block configured to receive the individual encryption key from the common area by accessing the common area of the storage block of the communications device by use of the common encryption key; This authentication terminal has an individual area information reception block configured to receive the financial card information from the individual area by accessing the individual area of the storage block of the communications device by use of the received individual encryption key.

The storage block of the above-mentioned reader/writer records a common encryption key necessary for accessing the common area of the memory area in the storage block of the communications device. The above-mentioned common area information reception block accesses the common area in the storage block of the communications device by use of the common encryption key to receive the individual encryption key recorded to the common area. Further, the individual area information reception block accesses the individual area in the storage block of the communications device by use of the received individual encryption key to receive the financial card information from the individual area. This novel configuration can restrict the encryption key to be held in the authentication terminal only to the common encryption key, thereby eliminating the necessity for online distributing encryption keys from the host computer and reducing the time necessary for authentication processing.

The above-mentioned storage block of the communications device may has an individual area to which financial card information is recorded for each financial card registered by a user and which is accessible by use of an individual encryption key unique to the each financial card instead of the individual area to which financial card information is recorded for each financial organization and which is accessible by use of an individual encryption key unique to the each financial organization. This novel configuration allows the provision of security for each item of financial card information, thereby restricting the damage inflicted by the leakage of an individual encryption key, if any, only to the affected financial card information.

A storage management block may also be arranged in which the received individual encryption key is stored in the storage block. This storage management block may delete the individual encryption key from the storage block after receiving the financial card information.

The storage management block of the above-mentioned reader/writer may store the received individual encryption key into the storage block and delete the stored individual encryption key from the storage block after receiving financial card information. This novel configuration allows no individual encryption key to be left on the reader/writer side after the completion of financial card information read processing, thereby making it unnecessary for the reader/writer to manage the individual encryption key, leading to significantly enhanced security.

In carrying out the invention and according to yet another embodiment thereof, there is provided an authentication method of providing authentication between a communications device and an authentication terminal. The communication device includes a storage block having an individual area to which financial card information is recorded for each financial organization and which is accessible by use of an individual encryption key unique to the each financial organization and a common area to which an individual encryption key for the each financial organization. The authentication terminal includes a reader/writer holding a common encryption key necessary for accessing the common area and capable of transmitting and receiving information with the communications device through the reader/writer. This authentication method has a common area information transmission process of transmitting the individual encryption key from the common area to the reader/writer through the communications device when the common area is accessed by the reader/writer by use of the common encryption key; This authentication method has a common area information reception process of receiving the individual encryption key through the communications device by the reader/writer; This authentication method has an individual area information transmission process of transmitting the financial card information from the individual area to the reader/writer through the communications device when the individual area is accessed by the reader/writer by use of the received individual encryption key; This authentication method has an individual area information reception process of receiving the financial card information through the communications device by the reader/writer.

In the common area information transmission process of the above-mentioned authentication method, the communications device transmits the individual encryption key recorded to the common area to the reader/writer when the common area is accessed by the reader/writer by use of the common encryption key. In the common area information transmission process, the communications device transmits the financial card information recorded to the individual area to the reader/writer when the individual area is accessed by the reader/writer by use of the received individual encryption key. In addition, in the individual area information reception process, the reader/writer receives the financial card information from the communications device. This novel configuration can restrict the encryption key to be held in the authentication terminal only to the common encryption key, thereby eliminating the necessity for online distributing encryption keys from the host computer and reducing the time necessary for authentication processing.

In carrying out the invention and according to a different embodiment thereof, there is provided a program configured to drive a communications device capable of transmitting and receiving information with a non-contact integrated circuit chip reader/writer. The non-contact integrated circuit chip reader/writer includes a storage block having an individual area to which financial card information is recorded for each financial organization and which is accessible by use of an individual encryption key unique to the each financial organization and a common area to which an individual encryption key for the each financial organization is recorded and which is accessible by use of an common encryption key recorded on the reader/writer. The above-mentioned program makes a computer installed on the communications device realize a first transmission function of transmitting the individual encryption key from the common area to the reader/writer through the communications device when the common area is accessed by the reader/writer by use of the common encryption key and a second transmission function of transmitting the financial card information from the individual area to the reader/writer through the communications device when the individual area is accessed by the reader/writer by use of the received individual encryption key.

The above-mentioned first transmission function transmits the individual encryption key recorded to the common area to the reader/writer when the common area is accessed by the reader/writer by use of the common encryption key. The above-mentioned second transmission function transmits the financial card information recorded to the individual area to the reader/writer when the common area is accessed by the reader/writer by use of the individual key. This novel configuration restricts the necessary encryption keys held in the authentication terminal only to the common encryption key, thereby making it unnecessary for the host computer to distribute encryption keys online, which reduces the risk of interception of encryption keys.

In carrying out the invention and according to a still different embodiment thereof, there is provided a program configured to drive an authentication terminal. The authentication terminal includes a non-contact IC chip reader/writer capable of transmitting and receiving information with a communications device. The communications device includes a storage block having an individual area to which financial card information is recorded for each financial organization and a common area to which a common encryption key for accessing the individual area is recorded. The above-mentioned program makes a computer installed on the reader/writer realize a first reception function of receiving an individual encryption key from the common area by accessing the common area of the storage block of the communications device by use of the common encryption key and a second reception function of receiving the financial card information from the individual area by accessing the individual area in the storage block of the communications device by use of the received individual encryption key.

The above-mentioned first reception function receives the individual encryption key recorded to the common area by accessing the common area in the storage block of the communications device. The above-mentioned second reception function receives the financial card information recorded to the individual area by accessing the individual area in the storage of the communications device by use of the received individual key. This novel configuration can restrict the encryption key to be held in the authentication terminal only to the common encryption key, thereby eliminating the necessity for online distributing encryption keys from the host computer and reducing the time necessary for authentication processing.

As described above and according to the invention, the time necessary for executing authentication processing is significantly reduced, while it becomes unnecessary for online distributing encryption keys from a host computer to financial terminals.

BRIEF DESCRIPTION OF THE DRAWINGS

FIG. 4 is a conceptual diagram illustrating an exemplary configuration of information in an index area practiced as the above-mentioned embodiment of the present invention;

FIG. 5 is a conceptual diagram illustrating an exemplary configuration of information in a financial card area practiced as the above-mentioned embodiment of the present invention;

FIG. 13 is a diagram illustrating details of a simulation result of a processing time necessary for an encryption key search operation based on a general configuration.

DETAILED DESCRIPTION OF THE PREFERRED EMBODIMENTS

Figure 1:
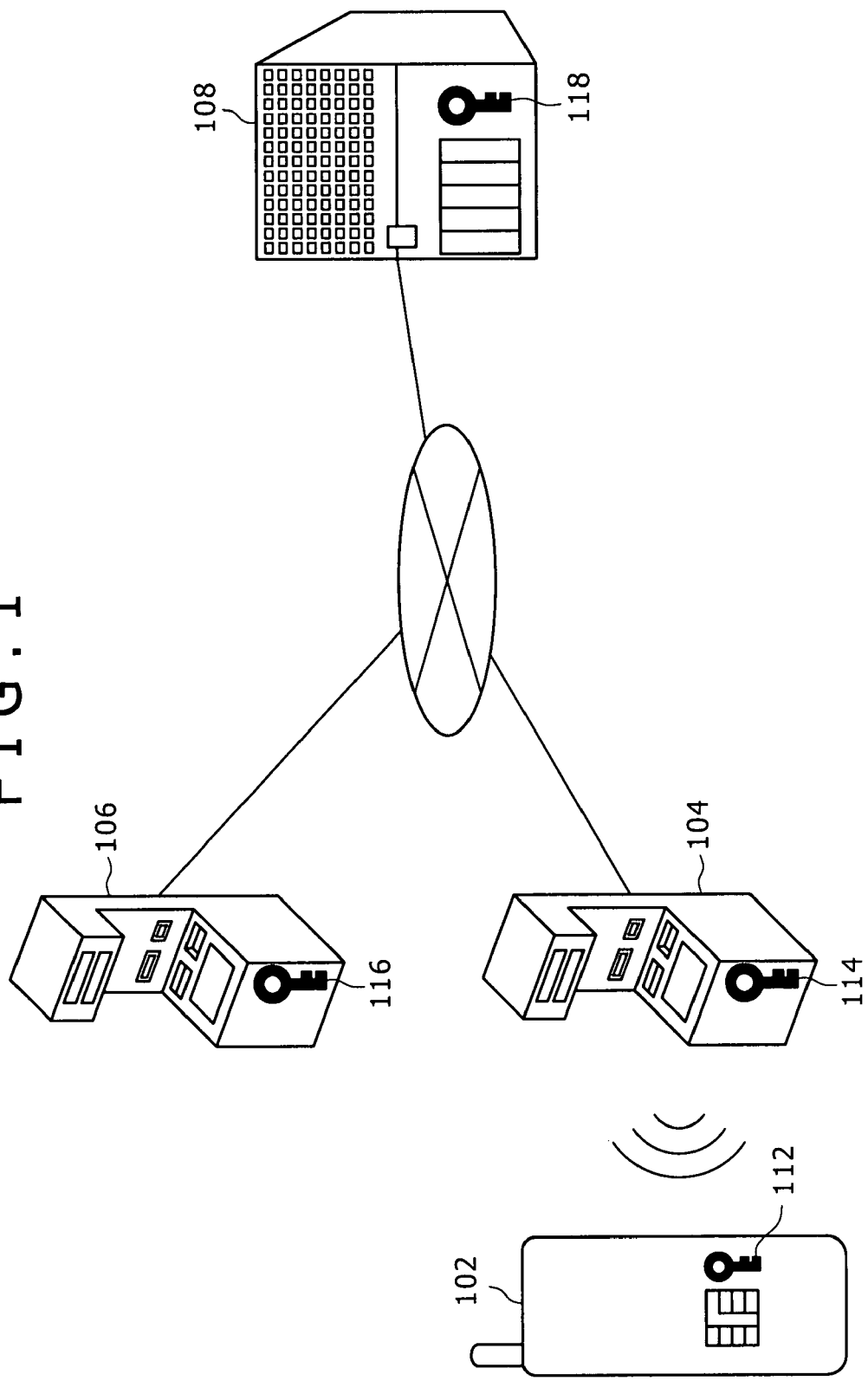
FIG. 1 is a schematic diagram illustrating an exemplary configuration of a financial card system practiced as one embodiment of the present invention.

This invention will be described in further detail by way of embodiments thereof with reference to the accompanying drawings. It should be noted that, throughout the description herein and the drawings accompanying hereto, components having substantially the same functional configuration are denoted by the same reference numeral, thereby skipping the duplicate description.

<Configuration of a Financial Card System>

The following describes an exemplary configuration of a financial card system practiced as one embodiment of the invention with reference to FIG. 1. This financial card system has a communications device 102, authentication terminals 104 and 106, and a host computer 108.

The communications device 102 is a portable terminal on which a non-contact IC chip is installed. In what follows, a portable telephone on which a non-contact IC chip is installed is assumed as one example of the communications device 102, but not limited thereto. The form of the communications device 102 may be a non-contact IC card or a portable telephone, a portable player, a wrist watch, or a PDA (Personal Digital Assistant) on which a non-contact IC chip is installed, for example.

The communications device 102 may also have a plurality of non-contact IC chip installed thereon and have a configuration in which these non-contact IC chips are used according to applications. For example, one non-contact IC chip may undertake a role of a financial IC card that manages the financial card information of each financial organization, while another non-contact IC chip may undertake a role of an IC card for retail store's settlement service. As known, non-contact IC chips are widely used for financial services, payment settlement services, ticket examination services in public transport, and entrance and exit management services in theatres and so on, for example. The non-contact IC chip associated with the present embodiment may be configured to provide any of the above-mentioned services, provide one of the services, or provide a plurality of services.

The following description will be made by use of the communications device 102 on which one non-contact IC chip capable of providing financial services is installed, for example. The following briefly describes financial services that can be provided by the present embodiment. The above-mentioned financial services mainly include deposit and saving services, loan services, and settlement services, for example. Normally, these financial services are provided through financial cards individually issued by financial organizations and ATM terminals managed by financial organizations or allied financial organizations. In general, different types of financial cards are used for different services, such as deposit and saving, loan, and so on. Financial cards are of various types; cash cards (debit cards), credit cards, and load cards, for example. The non-contact IC chip according to the present embodiment is configured to individually manage the above-mentioned various types of financial card information and maintain the security of each individual item of financial card information at a relatively high level. It should be noted that the non-contact IC chip according to the present embodiment is also applicable if a user has a plurality of items of the financial card information of the same type.

The authentication terminal 104 and the authentication terminal 106 match the registration information recorded to the communications device 102 against the registration managed in the authentication terminal 104 and the authentication terminal 106, thereby authenticating the user. The authentication terminal 104 and the authentication terminal 106, interconnected through the host computer 108 and a network, are configured to receive various information including the above-mentioned registration information from the host computer 108. The above-mentioned network is normally configured by a communications path based on a leased line by taking the security of information into consideration; it is also technically practicable to a general public line for the network. On the other hand, the authentication terminal 104 and the authentication terminal 106 are connected to a reader/writer, not shown, that is communicable with the communications device 102 in a non-contact manner, thereby reading registration information for example from the communications device 102.

In what follows, ATMs (Automatic Teller Machines) of a financial organization are assumed as the authentication terminal 104 and the authentication terminal 106. Obviously, the authentication terminal 104 and the authentication terminal 106 to which the present embodiment is applicable are not limited to ATMs; for example, any data reading devices configured to directly or indirectly execute the cross certification of registration information for example by use of the communications device 102 may be used. These data reading devices include a CAT (Credit Authorization Terminal), other credit card authentication terminals (CCTs), or a reward card processing terminal, for example.

The host computer 108 holds the registered authentication information typified by account registration information and has a capability of matching the authentication information received from the authentication terminal 104 and the authentication terminal 106 and held in the communications device 102 against the authentication information held in the host computer 108. Normally, the host computer 108 is individually installed by each financial organization for example managing the authentication terminal 104 and the authentication terminal 106 and is connected to ATM terminals under the control of the financial organization concerned, ATM terminals under the control of allied financial organization concerned, or the host computer, not shown, of the allied financial organization concerned via a network. Also, the host computer 108 undertakes a role of distributing encryption keys necessary for the encrypted communication between the communications device 102 and the authentication terminal 104 and the authentication terminal 106.

The following confirms the features of the present embodiment again by overviewing the entire configurational diagram of the financial card system shown in FIG. 1. In what follows, it is assumed that the communications device 102 and the authentication terminal 104 be communicable with each other as shown in FIG. 1. The financial card system provides information management means configured to mitigate the load of authentication processing of the authentication terminal 104 and the authentication terminal 106 and, while maintaining the security between the authentication terminal 104 and the authentication terminal 106 and the host computer 108, securely manage the financial card information recorded to the communications device 102. Especially, the feature of this information management means lies in a method of managing an encryption key for encrypting the communication between the communications device 102 and the authentication terminal 104.

As shown in the figure, the communications device 102 has an encryption key 112. The authentication terminal 104 and the authentication terminal 106 have an encryption key 114 and an encryption key 116, respectively. In addition, an encryption key 118 is held in the host computer 108. The encryption key 114 and the encryption key 116 held in the authentication terminal 104 and the authentication terminal 106 are distributed from the host computer 108 and the same common encryption keys as the encryption key 118. On the other hand, the encryption key 112 held in is an individual encryption key unique to each item of financial card information recorded to the communications device 102 and stored in a tamper-proof storage area that can be accessed only by use of the encryption key 114 held in the authentication terminal 104. Therefore, the financial card information recorded to the communications device 102 is robustly protected by the above-mentioned common encryption key and individual encryption key. Further, the authentication terminal 104 need not have the above-mentioned individual encryption key and therefore the host computer 108 need not distribute the individual encryption key to the authentication terminal 104.

The following briefly describes differences between related-art financial card systems and that practiced as one embodiment of the present invention in order to clarify advantages to be obtained by the adoption of the above-mentioned novel configuration. Although there are more advantages in the adoption of the novel configuration, the following describes only the differences in main advantages.

Related-art financial card systems hold the above-mentioned individual encryption key in each authentication terminal. This involves these problems: (1) each authentication terminal must hold individual encryption keys corresponding to all financial cards issued by more than thousands of financial organizations; (2) every time a new allied financial organization for example is added, the host computer must securely and surely distribute a new encryption key to all of tens of thousands of authentication terminals; and (3) in authenticating the communications device, the authentication terminal must require a relatively very long time in order to search for the individual encryption key corresponding to the financial card information to be used for a transaction concerned.

In contrast, the financial card system practiced as one embodiment of the present invention holds the above-mentioned individual encryption key in the communications device 102 thereof. And the authentication terminal 104 holds only the common encryption key for accessing the tamper-proof storage block in which the individual key concerned is stored. Consequently, (1) the authentication terminal 104 and the authentication terminal 106 may only hold the individual encryption keys concerned; (2) if a new applied financial organization for example is added, the host computer 108 need not distribute a new individual encryption key to the authentication terminal 104 and the authentication terminal 106; and (3) the authentication to be executed between the communications device 102 and the authentication terminal 104 can be completed in a significantly short period of time after the first authentication based on the above-mentioned common encryption key, which allows the acquisition of the individual key corresponding to the financial card information to be used for a transaction concerned.

The following Table 1 lists approximate search speed differences in the current usage environment (a current typical non-contact IC chip) with respect to above-mentioned point (3). However, if the processing speed of the non-contact IC chip and the processing speed of the authentication terminal increases in the future, the speed ratios are expected to become approximately the same as presented in this table if the same apparatus is used to make a comparison between the above-mentioned two authentication means. Accordingly, the following values are considered to be helpful to understand the effects.

TABLE 1

Comparisons of processing times required for encryption key search processing (approximate value)

| Number of allied financial organizations | Search processing time (related-art configuration) | Search processing time (embodiment of the invention) |
| --- | --- | --- |
| 100 | 280 ms | 250 ms |
| 200 | 540 ms | 250 ms |
| 300 | 810 ms | 250 ms |
| 400 | 1080 ms | 250 ms |
| 500 | 1340 ms | 250 ms |
| 600 | 1610 ms | 250 ms |
| 700 | 1880 ms | 250 ms |
| 800 | 2150 ms | 250 ms |
| 900 | 2420 ms | 250 ms |
| 1000 | 2690 ms | 250 ms |
| 1100 | 2950 ms | 250 ms |
| 1200 | 3220 ms | 250 ms |
| 1300 | 3490 ms | 250 ms |
| 1400 | 3750 ms | 250 ms |
| 1500 | 4020 ms | 250 ms |
| 1600 | 4300 ms | 250 ms |
| 1700 | 4560 ms | 250 ms |
| 1800 | 4830 ms | 250 ms |
| 1900 | 5100 ms | 250 ms |
| 2000 | 5400 ms | 250 ms |

(ms = 0.001 second)

The numerical comparisons listed in Table 1 above are nothing but values obtained by simulation (refer to FIG. 13 for detail). Considering that the number of transactional allied financial organizations reaches a scale of several thousands in the general-purpose ATM terminals installed at financial organization called mega-banks for example and convenience stores, the search speed difference over about 20 times (2000 organizations) indicated by the current practicing environment seems to have a great influence on the enhancement of user convenience. It should be noted that, referring to Table 1 above, it seems that the search processing time by the present embodiment be constant; however, to be strict, as the number of allied financial organizations increases, the processing time accordingly increases slightly (to a negligible level).

Obviously, whether the processing times listed in Table 1 above is slow or fast depends on personal subjective feeling. Generally, however, a wait time of less than 1.5 seconds seems to make the user feel that the processing has been completed fast enough. Referring to Table 1 above again, if the number of allied financial organizations is 100 to 200, the user feels the processing having been completed at once (0.5 seconds or faster). Similarly, if the number of allied financial organizations is 200 to 500, the user feels the processing having been completed quickly enough (1.5 seconds or faster). However, if the number of allied financial organizations is 600 or over, then the user begins to be aware of the wait time for the processing and feels that the user is put in a wait status (3 seconds or longer) if the number of financial organizations exceeds 1200. Thus, if the number of transactional allied financial organizations is as small as 1000 or less, the advantages of the application of the present embodiment to the financial card system can be expected.

Thus, the configuration of the financial data system according to the present embodiment has been described briefly. The features of the present embodiment have also been described by comparing with the features of related-art financial data systems. As described above with reference to specific values (namely, Table 1 above), the present embodiment provides solutions for the contradictory requirements that authentication processing must be executed at high speeds while enhancing security. The outline of the present embodiment has described so far, and the following describes in detail a preferred form of each of the components of the present embodiment that are required to provide these solutions.

<Configuration of Communications Device 102>

Figure 2:
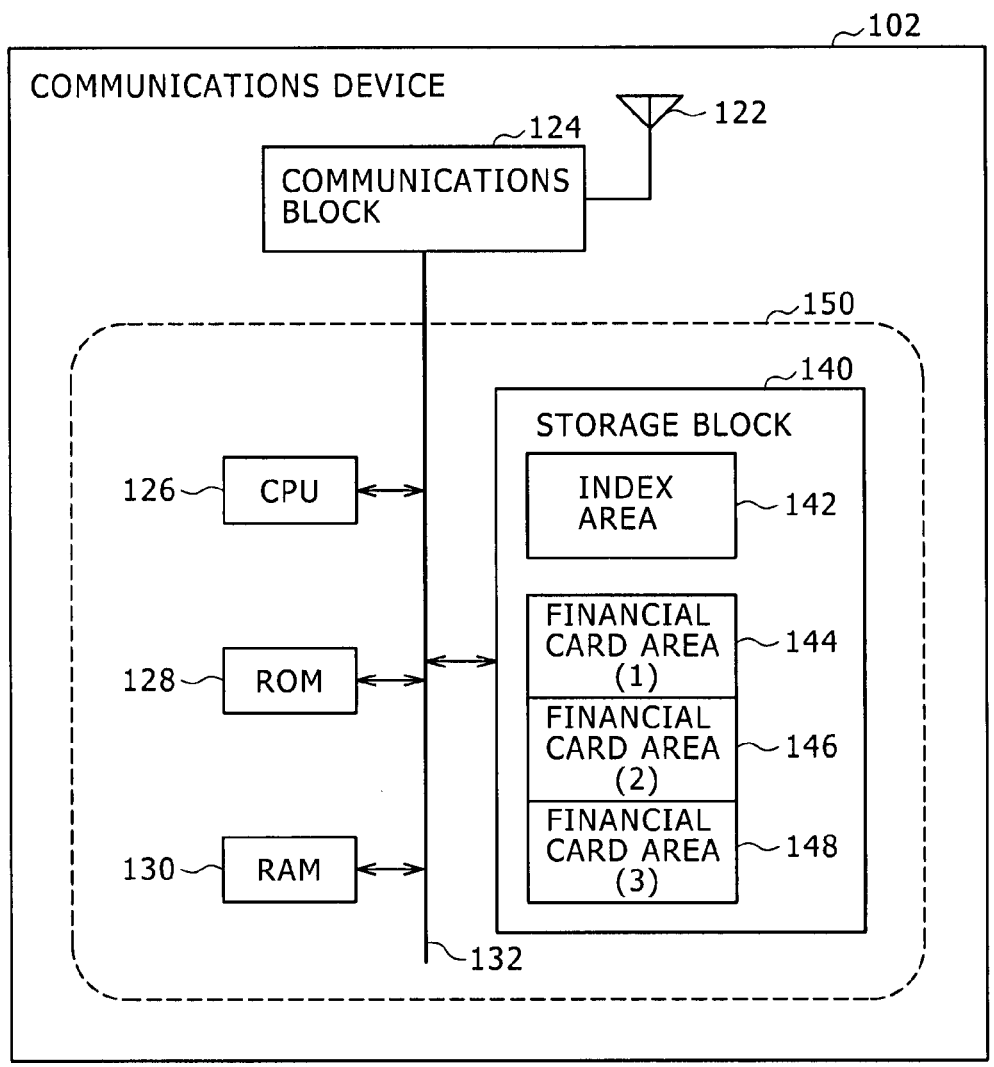
FIG. 2 is a block diagram illustrating an exemplary configuration of a communications device practiced as the above-mentioned embodiment of the present invention.

The following describes in detail an exemplary configuration of the communications device 102 practiced as one embodiment of the present invention with reference to FIG. 2. Referring to FIG. 2, there is shown a block diagram of the exemplary configuration of the communications device 102.

The communications device 102 is mainly made up of an antenna 122, a communications block 124, and a non-contact IC chip 150.

The antenna 122 may be made up of a loop antenna and transmit and receive a signal carrier with a reader/writer, not shown, for the non-contact IC chip. This loop antenna is capable of receiving a signal carrier transmitted by the reader/writer on the basis of the principle of electromagnetic induction. Consequently, the electronic circuitry constituting the communications block 124 can also be driven by the induced electromotive force generated through this loop antenna. The antenna 122 may also be a high-frequency transmission/reception antenna for wirelessly transmitting and receiving information with a network, such as the Internet. In FIG. 2, only one antenna 122 is illustrated; it is also practicable to separately arrange an antenna having loop antenna capability and an antenna having high-frequency transmission/reception antenna capability.

The communications block 124 is constituted by a front-end circuit, not shown, and a power regenerative circuit, not shown. The front-end circuit receives information from the signal carrier supplied from the reader/writer and divides the signal carrier to generate a clock for driving each component constituting the communications device 102. The power regenerative circuit regenerates, from the signal carrier, the power for driving each circuit constituting the communications device 102. The communications block 124 supplies the power and information obtained from the reader/writer as described above to the non-contact IC chip 150 via a bus 132.

It should be noted that is an embodiment of a common area information transmission block and an individual area information transmission block. The communications block 124 may also function as communication means for an external network. For example, the communications block 124 may be communication means for a network connected between the non-contact IC chip and the external host computer 108.

The non-contact IC chip 150 is main constituted by a CPU (Central Processing Unit) 126, a ROM (Read Only Memory) 128, a RAM (Random Access Memory) 130, and a storage block 140. It should be noted that the non-contact IC chip 150 is not limited to the above-mentioned configuration. For example, the non-contact IC chip 150 may include the communications block 124 and the antenna 122.

The CPU 126 controls the components of the non-contact IC chip 150 as instructed by a program stored in the ROM 128. For example, the CPU 126 buffers the information received through the communications block 124 or reads the information buffered in the RAM 130. Also, the CPU 126 may buffer the information received through the communications block 124 into the RAM 130 and then stored the buffered information into the storage block 140. In addition, if the information received through the communications block 124 is encrypted, the CPU 126 may also function as a decryption block for decrypting the encrypted information. In this case, the CPU 126 may also function as a decryption key generating block for generating a decryption key for decrypting the encrypted information. It should be noted that this function as the decryption block may function as a common key decryption block for decrypting the information about a common encryption key received from the authentication terminal 104.

Further, the CPU 126 may also function as a common key generating block for generating a common encryption key for accessing an index area 142, alternatively, may function as an individual key generating block for generating an individual encryption key for accessing each financial card areas. The CPU 126 may also function as a common area information encryption block for encrypting common area information recorded to the index area 142 or as an individual area information encryption block for encrypting the information recorded to each financial card area.

The ROM 128 stores programs and data that are necessary for the CPU 126 to operate. For example, programs stored the ROM 128 may include an encryption key generating program for generating a common encryption key for accessing the index area 142 and an individual encryption key for accessing each financial card area. Also, programs stored in the ROM 128 may include an encryption program for encrypting the information recorded to the index area 142 or each financial card area. Further, programs stored in the ROM 128 may include a decryption program for decrypting in the case that the information received through the communications block 124 is encrypted.

The RAM 130 functions as a buffer area in which the data to be processed by the CPU 126 is temporarily stored. For example, the RAM 130 is used to temporarily store the received encrypted information and record decrypted information when the CPU 126 decrypts the encrypted information.

The storage block 140 is mainly constituted by the index area 142 and a financial card areas 144, 146, and 148.

The index area 142 is one example of a common area that is accessible by use of a common encryption key held in the authentication terminal 104. The index area 142 stores an area code for identifying each financial card area with financial card information recorded and an individual encryption key for accessing the financial card area. It should be noted that the financial card area denotes a specific example of an individual area allocated to each financial card or each financial organization issuing each financial card, which will be described later in detail. In the figure, three financial card areas 144, 146, and 148 are shown by way of example. In what follows, it is assumed that each financial card area be one specific example of an individual area allocated to each financial organization.

The financial card areas 144, 146, and 148 are specific examples of individual areas that are accessible of an individual encryption key unique to each financial organization recorded to the index area 142. The financial card area is divided into a financial card area (1) 144, a financial card area (2) 146, and a financial card area (3) 148 for each financial organization. It should be noted that, in FIG. 2, an example indicative of the registration of the financial card information for three financial organizations is shown; it is also practicable to register the financial card information for four or more financial organizations or two or one financial organization.

Figure 3:
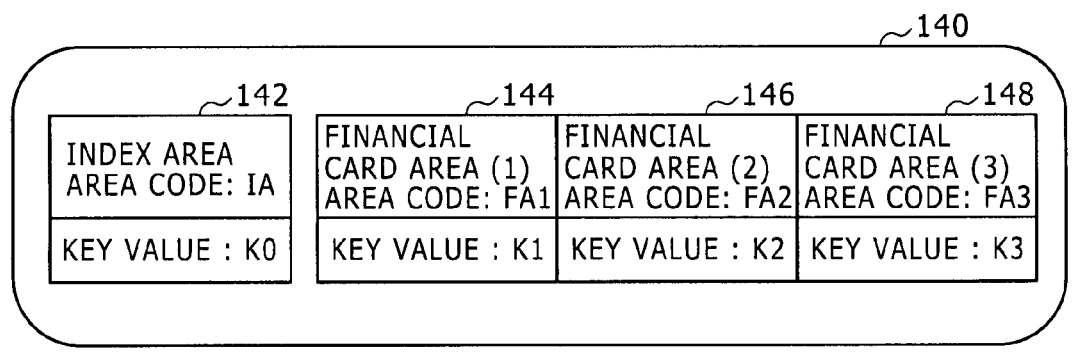
FIG. 3 is a conceptual diagram illustrating an exemplary configuration of a storage block of the above-mentioned communications device.

The following describes in detail a configuration of the storage block 140 with reference to the specific examples shown in FIGS. 3 through 5. FIG. 3 is a conceptual diagram illustrating a configuration of the storage block 140 and a configuration of information stored in the storage block 140. FIG. 4 is a conceptual diagram illustrating in detail a configuration of information recorded to the index area 142. FIG. 5 is a conceptual diagram illustrating in detail a configuration of information recorded to the financial card area (1) 144.

First, with reference to FIG. 3, the configuration of the storage block 140 and the configuration of the information to be stored in the storage block 140 will be described.

As described above, the storage block 140 is made up of the index area 142, the financial card area (1) 144, the financial card area (2) 146, and the financial card area (3) 148. The index area 142 records key value K0 that is a specific example of a common encryption key. Further, the recording position of the index area 142 is identified by area code IA. The financial card area (1) 144 records key value K1 that is a specific example of an individual encryption key. The recording position of the financial card area (1) 144 is identified by area code FA1. Likewise, the recording position of the financial card area (2) 146 is identified by area code FA2, at which key value K2 that is a specific example of an individual encryption key is recorded. Likewise, the recording position of the financial card area (3) 148 is identified by area code FA3, at which key value K3 of an individual encryption key is recorded.

Therefore, the authentication terminal 104 must know key value K0 so as to access the index area 142. Likewise, the authentication terminal 104 must know key value K1 to access the financial card area (1) 144, key value K2 to access the financial card area (2) 146, and key value K3 to access the financial card area (3) 148. It should be noted that accessing these areas denotes the identification of an area in which desired information is recorded to make the desired information ready for reading. The following describes the access by the authentication terminal 104 having key value K0 to the index area 142, for example. The authentication terminal 104 specifies area code IA to present key value K0 to the communications device 102, requiring the communications device 102 to accept a request for reading the information from the index area 142. When this access authentication has been normally completed, the authentication terminal 104 becomes ready for reading various information from the index area 142 of the communications device 102.

It should be noted that, in FIG. 3, the index area 142 is shown separately from the financial card area 144, 146, and 148. It is also practicable for these areas to be allocated to physically divided memory areas or logically divided memory areas. For the purpose of convenience of conceptual recognition, FIG. 3 shows these areas separately in order to recognize the index area 142 separately from the financial card areas 144, 146, and 148; therefore FIG. 3 does not show any special difference in storage area dividing means and storage area configuration. Consequently, the financial card area (1) 144 and the financial card area (2) 146 may be allocated to two physically divided memory areas, respectively, for example. The index area 142 and the financial card area (3) 148 may be allocated to two logically divided memory areas, respectively, for example.

(Details of Index Area 142)

The following describes details of configurations of various information to be recorded to the index area 142 with reference to FIG. 4.

Referring to FIG. 4, the index area 142 mainly records an IC chip code, area codes FA1, FA2, and FA3 corresponding to financial card areas, individual encryption keys (key values K1, K2, and K3) for accessing financial card areas, and an encryption type code.

The IC chip code denotes information for uniquely identifying the non-contact IC chip 150. The communications device 102 according to the embodiment of the invention is assumed to have a configuration in which only one non-contact IC chip 150 is installed. In another embodiment, two or more non-contact IC chips may be installed on the communications device 102. Therefore, in order to provide a more general-purpose configuration, the index area 142 has the IC chip code as one piece of information.

Area codes FA1, FA2, and FA3 provide information indicative of a recording position of each financial card area registered in the storage block 140. The index area 142 records the area codes corresponding to all financial card areas registered in the storage block 140.

Key values K1, K2, and K3 are individual encryption keys necessary for accessing the financial card areas registered in the storage block 140. The index area 142 records individual encryption keys corresponding to all financial card areas registered in the storage block 140. It should be noted that each of the above-mentioned area codes and each of the above-mentioned key values may be related with each other for each financial card area; for example, when the authentication terminal 104 acquires a predetermined key value by use of a common encryption key, the authentication terminal 104 may be also configured to acquire, at the same time, the area code corresponding to that key value.

The encryption type code denotes information that identifies a scheme or algorithm, which, in the case of transmitting the information recorded to the index area 142 or the information recorded to each financial card area to the authentication terminal 104, encrypts them. As will be described later, in order to enhance information security, the authentication terminal 104 can encrypt the information to be transmitted and received between the communications device 102 and the authentication terminal 104. In that regard, by assuming a configuration corresponding to a plurality of encryption schemes, the encryption type code is included in the information held in the index area 142. Therefore, although the encryption type code is not always required in practicing the present invention, if the recent raised awareness of information security and the necessity thereof is considered, the encryption above is required. It is considered preferable for the configuration of the present embodiment to include the encryption type code in the index area 142 to that end.

For the information to be stored in the index area 142, the above-mentioned configuration is basic. It is also practicable to add further information to the area code corresponding to each financial card area. For example, the additional information may be the information that sets a financial card to be preferentially processed in transaction from among the registered financial cards. Namely, the area codes for identifying financial card areas may be prioritized in the financial card information. The following supplementarily describes the area code corresponding to each financial card area recorded to the index area 142.

Generally speaking, each financial card user owns a financial card for each financial organization with which the user conducts transaction. Also, a user may own two or more different financial cards for different types of transactions to be conducted at one financial organization. Further, it is possible for a user to have two or more financial cards for a same financial organization and a same transactional type. Such a financial card usage form is caused by that the user believes it convenient to manage his/her own account. Therefore, there exist a financial card that is preferentially used by that user and a financial card that is less preferentially used.

Especially, as with the present embodiment, if a plurality of items of financial card information are managed by the same communications device 102, then the configuration for setting priority to each item of financial card information can not only prevent such troubles from happening as the reading of financial card information by the authentication terminal 104 not intended by the user, but also significantly enhance user convenience.

Consequently, the present embodiment can be configured so as to add priority information (or a priority flag) for specifying the priority of each transactional processing operation to the area code for identifying each financial card area to be recorded to the index area 142. As a result, the authentication terminal 104 can access the index area 142 and, in reading the area code corresponding to a desired financial card area, automatically recognize the financial card information to be preferentially read from among a plurality items of financial information recorded to the financial card area concerned, thereby enhancing the speed of transactional processing. Thus, the details of the main common area information to be recorded to the index area 142 has been described. It should be noted that, in what follows, each item of information recorded to the index area 142 is also generically referred to as common area information.

(Details of Financial Card Area (1) 144)

The following describes the details of a structure of each item of information to be recorded to the financial card area (1) 144 with reference to FIG. 5. In what follows, the financial card area (1) 144 will be described in detail as a typical example; the financial card area (2) 146 and the financial card area (3) 148 have also the same structure as that of the financial card area (1) 144.

Referring to FIG. 5, the information to be recorded to the financial card area (1) 144 is made up of card common information 1, card common information 2, card data 1 and card data 2, for example. These items of information and data are generically referred to as individual area information. The individual area information is made up of card data to which access is limited by the individual encryption key and the common information that can be accessed without the authentication processing based on the individual encryption key. Of the above-mentioned individual area information, card common information 1 and card common information 2 are classified into the above-mentioned common information and card data 1 and card data 2 are classified into the above-mentioned card data.

To be more specific, the above-mentioned common information includes the information whether there is a card or not, the name of card, and the type of transaction, for example. On the other hand, the above-mentioned card data includes an actual card number and so on. Thus, in accordance with the importance of information management, a configuration may be adopted in which whether the authentication based on the individual encryption key is required or not is determined. Obviously, a configuration in which all individual areas are protected by the individual encryption key is also practicable. However, in terms of user convenience, it is a general configuration for the authentication terminal 104 to present the types of services providable to the user through the communications device 102 concerned. Therefore, as described above, it is often preferable to employ the above-mentioned scheme in which the necessity of the authentication based on the individual encryption key is determined. Namely, those items of information which do not require a high security level are skipped in encryption key authentication, thereby enhancing the speed of transactional processing.

The common information may include a priority flag indicative of the priority of financial card information. For the priority flag, an exemplary configuration has already been introduced in which the priority flag is attached to the area code to be recorded to the index area 142. For example, assume that the priority flag to be attached to the area code concerned be called a first priority flag and a priority flag to be attached to the above-mentioned common information as a second priority flag, then use of the first and second priority flags by making distinction in between is sometimes advantageous. For example, a configuration is possible in which the first priority flag is used to specify a financial organization with which transaction is executed preferentially, while the second priority flag is used to specify a financial card to be used preferentially. Consequently, the configuration in which the second priority flag is added to the above-mentioned common information is also a preferred exemplary configuration according to the present embodiment. Thus, the specific configuration of the financial card area that is one example of the individual area has been described in detail. As described above, the present embodiment provides a preferred information configuration that mutually enhances information security and user convenience.

(Encryption of Individual Encryption Key)

The following describes a configuration in which the individual encryption key is further encrypted. As described above, by incorporating the above-mentioned new technological concept into the configuration of the storage block 140, the present embodiment is already considered to sufficiently enhance information security and user convenience. However, in view of the future advancement of cryptanalytic technologies, we propose herein a configuration that is intended to further enhance information security.

A configuration to be described below is associated with a method of encrypting an individual encryption key that is transmitted from the index area 142 to the authentication terminal 104. The features of the configuration introduced below lie in that the type of encryption can be changed for every non-contact IC chip installed on the communications device 102. For example, various types of encryption algorithms are available as shown in Table 2 below.

TABLE 2

One example of encryption types for encrypting individual encryption keys

| Encryption type code | Encryption algorithm |
| --- | --- |
| 0 | No encryption |
| 1 | Triple-DES 56 bits (IC chip code/area code |
| 2 | Triple-DES 56 bits (IC chip code/terminal key) |
| 3 | Triple-DES 112 bits (IC chip code/terminal key) |
| 4 | AES 128 bits (IC chip code/terminal key) |
| 5 | AES 256 bits (IC chip code/terminal key) |

The above-mentioned encryption algorithms are currently known technologies and therefore widely in use in the field of encrypted data communication. Therefore, the detail of these technologies are omitted from the following description. It should be noted that the encryption technologies applicable as the present embodiment are not limited to those listed in Table 2; for example, any future encryption technologies that provide higher security than currently available ones can be adopted as a preferred embodiment of the present invention.

The following briefly describes the encryption algorithms listed in Table 2. DES (Data Encryption Standard) is a typical standard of so-called common-key encryption. Triple-DES repeats three times the encryption executed by the normal DES and therefore is higher in encryption strength than the normal DES. AES (Advanced Encryption Standard) a next-generation standard encryption algorithm of the U.S. government selected by the NIST (National Institute of Standards and Technology) of the U.S.

The following describes again the encryption algorithm of the individual encryption key according to the present embodiment with reference to Table 2 above. The left column of Table 2 lists encryption type codes. The encryption type code has already been described along with the description of the common area information to be recorded to the index area 142. The encryption type code may be included as part of the above-mentioned common area information or and, in accordance with the encryption type code concerned, an algorithm for encrypting the individual encryption key recorded to the index area 142 concerned is determined. The following specifically describes the encryption algorithms corresponding to the encryption type codes listed in Table 2.

If the encryption type code=0, no encryption is executed. Namely, the authentication terminal 104 gets an individual encryption key not encrypted from the index area 142 and executes authentication for accessing an individual area (or a financial card area) to read the individual area information from that individual area.

If the encryption type code=1, the triple-DES encryption algorithm having 56-bit key length is used. To be more specific, the non-contact IC chip 150 encrypts the individual encryption key on the basis of the 56-bit key length triple-DES so as to decrypts, as a key value, a value obtained by combining an IC chip code and an area code recorded to the index area 142, for example. Therefore, the value corresponding to each area code has a different decryption key. Hence, the authentication terminal 104 generates a key value for decryption by combining the IC chip code and the area code read from the index area 142 and decrypts the individual encryption key concerned on the basis of the triple-DES algorithm concerned. Then, the authentication terminal 104 uses the decrypted individual encryption key to access the corresponding individual area (or financial card area), thereby reading the financial card information concerned.

If the encryption type code=2, the triple-DES encryption algorithm having 56-bit key length is used. To be more specific, the non-contact IC chip 150 encrypts the individual encryption key on the basis of the 56-bit key length triple-DES so as to decrypts, as a key value, a value obtained by combining an IC chip code and an authentication terminal key recorded to the index area 142, for example. The authentication terminal key denotes a decryption key for the encryption held in the authentication terminal 104 in advance. The authentication terminal 104 generates a key value for decryption by combining the IC chip code and the authentication terminal key read from the index area 142 and decrypts the individual encryption key concerned on the basis of the triple-DES algorithm concerned. Then, the authentication terminal 104 uses the decrypted individual encryption key to access the corresponding individual area (or financial card area), thereby reading the financial card information concerned.

If the encryption type code=3, the triple-DES encryption algorithm having a 112-bit key length is used instead of the above-mentioned 56-bit key length triple-DES encryption algorithm executed in the encryption type code=2.

If the encryption type code=4, the AES encryption algorithm having a 128-bit key length is used instead of the above-mentioned 56-bit key length triple-DES encryption algorithm executed in the encryption type code=2.

If the encryption type code=5, the AES encryption algorithm having a 256-bit key length is used instead of the above-mentioned 56-bit key length triple-DES encryption algorithm executed in the encryption type code=2.

As described above in detail, the individual encryption key transferred between the communications device 102 and the authentication terminal 104 may be encrypted by any of the encryption algorithm for each non-contact IC chip installed on the communications device 102. This configuration allows the provision of higher information security.

Thus, the configuration of the communications device 102 has been described in detail. Especially, the communications device 102 according to the present embodiment is characterized by the configuration of the storage block 140. To be more detail, the communications device 102 is characterized by the configuration of the memory area restricted in access by an encryption key and by the method of managing that encryption key. Specifically, the storage block 140 contains the index area 142 that is a common area and the financial card areas 144, 146, and 148 that are individual areas. The index area 142 stores the individual encryption keys for accessing the financial card areas 144, 146, and 148. Further, the index area 142 is configured to be accessible by use of a common encryption key held in the authentication terminal 104. Described in addition to these basic configurations were the configuration in which a priority flag is set to prioritize financial card information and the configuration in which each individual encryption key is further encrypted. These novel configurations allow the provision of means for significantly enhancing the speed of transactional processing that significantly affects user convenience, while maintaining a high security level.

<Configuration of Authentication Terminals 104 and 106>

Figure 6:
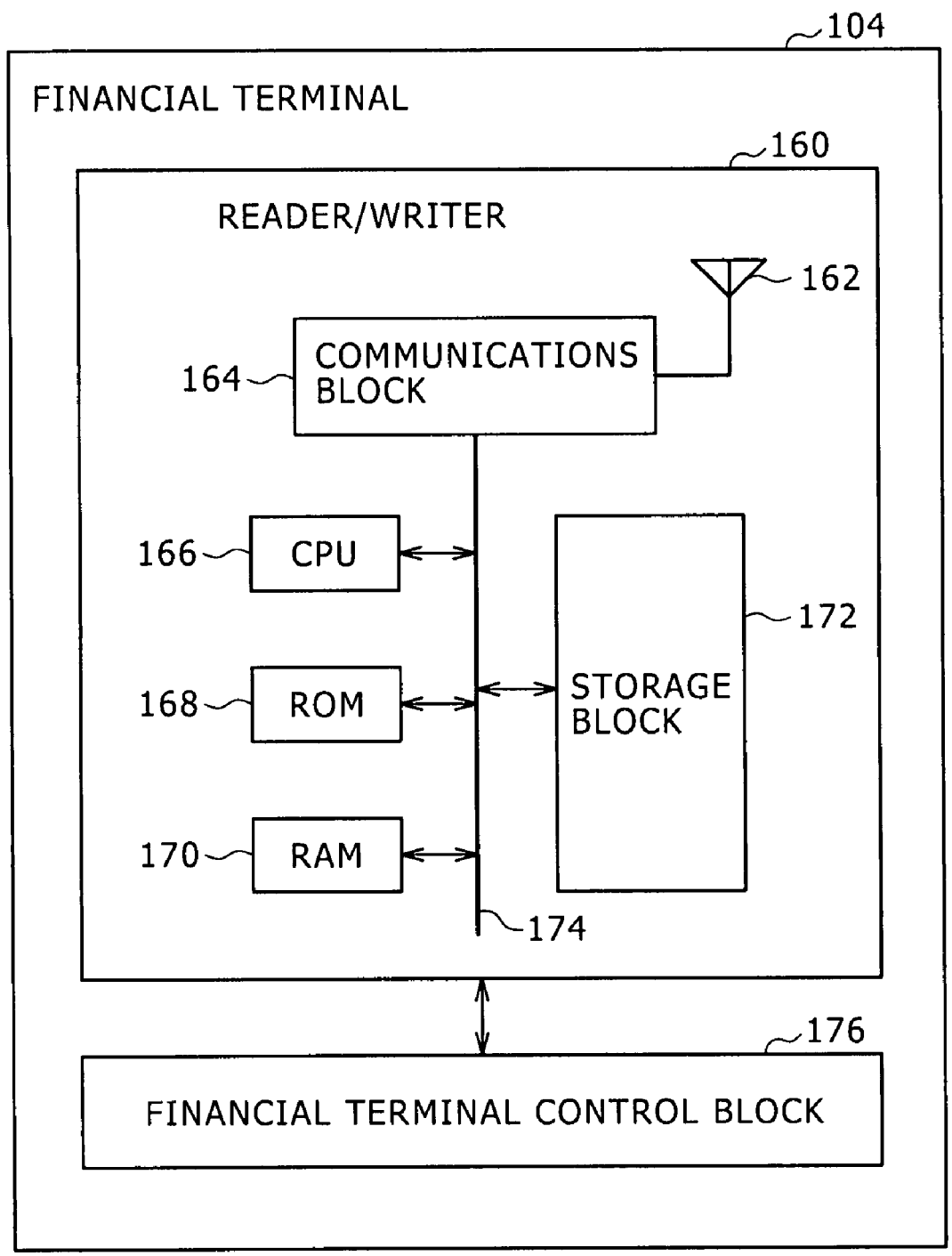
FIG. 6 is a block diagram illustrating an exemplary configuration of a financial terminal practiced as the above-mentioned embodiment of the present invention.

The following describes configurations of the authentication terminals 104 and 106 according to the present embodiment with reference to FIG. 6. FIG. 6 is a block diagram illustrating an exemplary configuration of a financial terminal (or an ATM terminal) that is one embodiment of the authentication terminal 104. It should be noted that the authentication terminal 106 shown in FIG. 1 has substantially the same configuration as that of the authentication terminal 104, so that only the configuration of the authentication terminal 104 will be typically described below.

The authentication terminal 104 is mainly made up of a reader/writer 160 and a financial terminal control block 176.

The reader/writer 160 is made up of an antenna 162, a communications block 164, a CPU 166, a ROM 168, a RAM 170, and a storage block 172.

The antenna 162 may be made up of a loop antenna and can transmit and receive a signal carrier with the communications device 102. This loop antenna is capable of transmitting a signal carrier to the communications device 102 on the basis of the principle of electromagnetic induction. Consequently, the reader/writer 160 can also generate an induced electromotive force via the loop antenna to supply to the communications device 102 as the power.

The communications block 164 mainly executes such processing as the establishment of communication with the communications device 102, signal carrier anti-collision processing, and authentication processing. Although not shown, the communications block 164 has a local oscillator, a modulator, a transmission amplifier, and a demodulator, for example. The local oscillator generates a signal carrier to be transmitted to the communications device 102. The modulator modulates the generated signal carrier. The modulated signal carrier is amplified by the transmission amplifier, the amplified signal carrier being supplied to the communications device 102 via the antenna 162. Conversely, a signal carrier received from the communications device 102 via the antenna 162 is demodulated by the demodulator and the demodulated signal carrier is transmitted to other components via a bus 174. It should be noted that the communications block 164 is an embodiment of a common area information reception block and an individual area information reception block. Therefore, as the common area information reception block, the communications block 164 is able to receive all individual encryption keys collectively transmitted from the communications device 102 and, as the individual area information reception block, receive individual area information.

The CPU 166 processes information as instructed by programs stored in the ROM 168, thereby controlling the operations of components of the authentication terminal 104. For example, the CPU 166 records information received through the communications block 164 to the RAM 170 and reads the information therefrom. Also, if the information received through the communications block 164 is encrypted, the CPU 166 may function as a decryption block for decrypting the received encrypted information. For example, if the common area information recorded to the common area of the communications device 102 has been received as encrypted, then the CPU 166 may also function as a common area information decryption block for decrypting the encrypted common area information. Likewise, if the individual area information recorded to the individual area of the communications device 102 has been received as encrypted, the CPU 166 may also function as an individual area information decryption block for decrypting the received encrypted individual area information. Further, the CPU 166 may also function as a common key generating block for generating a common key for accessing the common area of the communication device 102. Likewise, the CPU 166 may also function as an individual key generating block for generating an individual encryption key for accessing each area of the communications device 102 after getting the common area information from the common area of the communications device 102 and on the basis of the obtained common area information.

The ROM 168 mainly stores programs that specify the operations of the CPU 166. For example, a program stored in the ROM 168 may be a decryption program for decrypting encrypted information received through the communications block 164. Also, a program stored in the ROM 168 may be a decryption key generating program for generating a decryption key for decrypting the encrypted information. Further, a program stored in the ROM 168 may be a common encryption key generating program for generating a common encryption key for accessing the common area in the communications device 102 or an individual encryption key generating program for generating an individual encryption key for accessing the individual area in the communications device 102 on the basis of the common area information obtained from the common area in the communications device 102.

The RAM 170 provides a buffer in which to temporarily store data to be used by the CPU 166 for executing processing. For example, in decrypting the encrypted information by the CPU 166, the RAM 170 temporarily stores that information and records the decrypted information.

The storage block 172 preferably is tamper-proof and stores a common encryption key and an authentication terminal key. Term "tamper-proof" as used herein denotes the resistance against the unauthorized access to the information recorded to the storage block 172 from the outside. For example, a configuration may be provided in which, if an unauthorized access is made from the outside to the common encryption key or authentication terminal key recorded to the storage block 172, these common encryption key and authentication terminal key may be deleted from the storage block 172. This deletion processing may be executed by the CPU 166 as instructed by a anti-tamper processing program recorded to the ROM 168 or physically executed by the storage block 172.

The financial terminal control block 176 is connected to the reader/writer 160 to transmit and receive information with the reader/writer 160. Further, the financial terminal control block 176 can mainly issue control commands to control the operations of the reader/writer 160. The financial terminal control block 176 has input means through which the user enters transactional information and display means on which the user checks the entered transactional information to issue an operation command for the reader/writer 160 on the basis of the information entered by the user. In addition, the financial terminal control block 176 is connected to the host computer 108 managed by each financial organization via a network so as to transmit and receive information with the host computer 108. This connection allows the financial terminal control block 176 to make reference to the host computer 108 about various kinds of information, such as the information entered by the user and the information of the communications device 102 obtained through the compression conversion rule setting block 120, for example. The financial terminal control block 176 may also be configured to receive a common encryption key distributed from the host computer 108 and transmit the received key to the reader/writer 160, for example.

Thus, the configuration of the authentication terminal 104 has been described in detail with reference to FIG. 6. As described, the authentication terminal 104 is configured to hold a common encryption key in the storage block 172 to access the index area 142 of the storage block 140 in the non-contact IC chip 150. Also, the authentication terminal 104 is configured to access the financial card areas 144, 146, and 148 in the storage block 140 of the non-contact IC chip 150 by use of the individual encryption key, of the common area information obtained by use of the common encryption key. In addition, the authentication terminal 104 is able to decrypt the encrypted individual encryption key transmitted from the communications device 102. Therefore, the authentication terminal 104 thus configured provides high-speed authentication processing cooperating with the communication device 102 while maintaining high-level security.

<Flows of Transactional Processing>

So far, preferred system configurations and equipment configurations for embodying the present invention have been described. The following describes, in detail, flows of financial transaction in the above-mentioned financial card system by following the process of the processing executed by each of the components of this system. It should be noted that the configuration of each of these components has been described as above and therefore the configurational description is omitted from the following description.

(Common Area Authentication)

Figure 7:
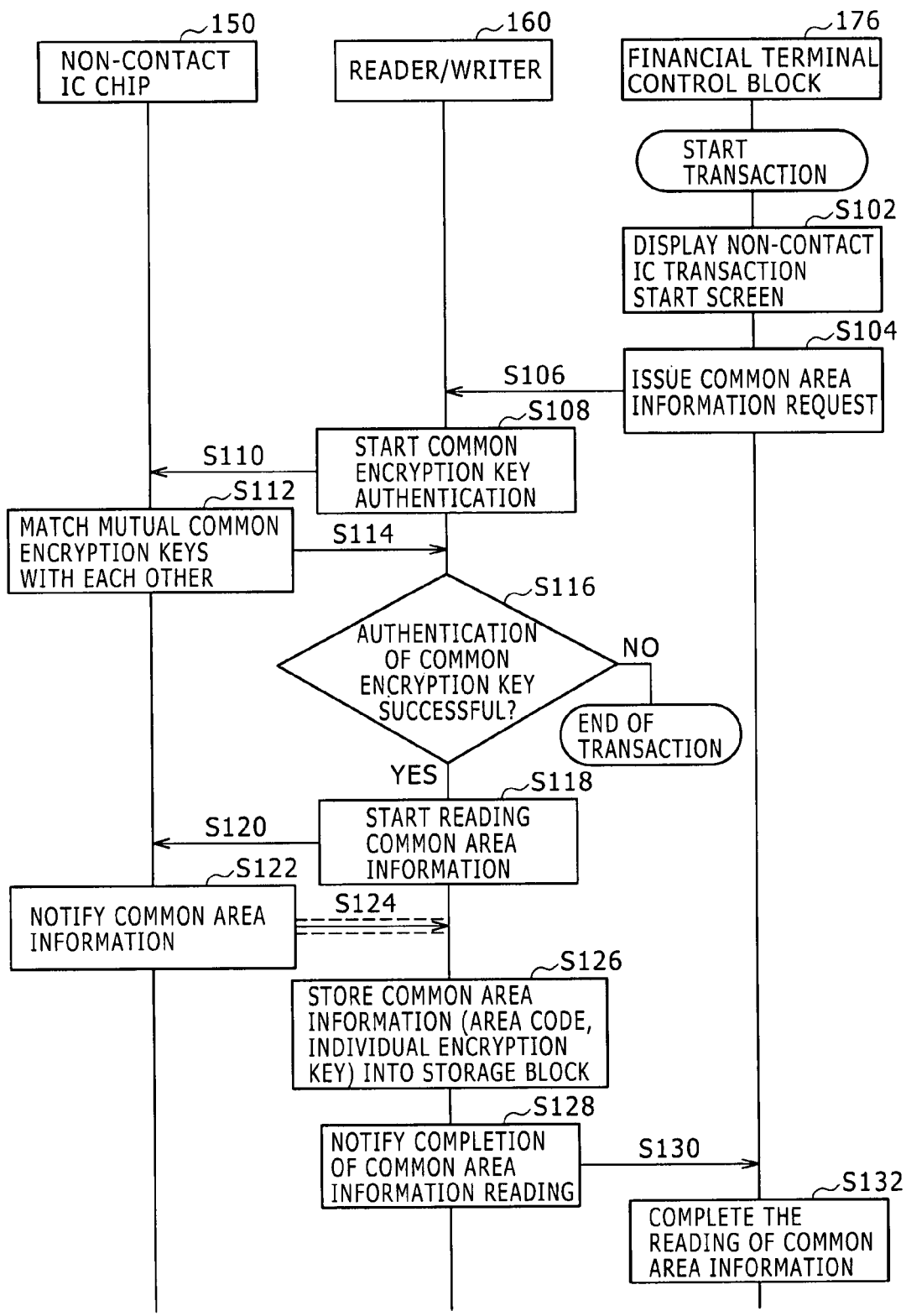
FIG. 7 is a sequence diagram indicative of processing of reading common area information practiced as the above-mentioned embodiment of the present invention.

First, a process of reading the individual area information from the non-contact IC chip 150 by the reader/writer 160 connected to the financial terminal control block 176, with reference to the sequence chart shown in FIG. 7.

Referring to FIG. 7, the financial terminal control block 176 displays a selection screen for letting the user select a transaction by use of the communications device 102 having a non-contact IC chip (hereafter referred to as a non-contact IC chip transaction) (S102). When the user selects a non-contact IC transaction on the selection screen, the financial terminal control block 176 issues a command for requesting common area information (hereafter referred to as a common area information request) (S104). Next, the financial terminal control block 176 transmits the common area information request to the reader/writer 160 (S106). At this moment, the reader/writer 160 may specify the area code of a common area to transmit the common area information request.

Receiving the common area information request from the financial terminal control block 176, the reader/writer 160 starts common encryption key authentication for the non-contact IC chip 150 (S108). First, the reader/writer 160 transmits the information about the common encryption key owned by itself to the non-contact IC chip 150 (S110).

The non-contact IC chip 150 receives the information about the common encryption key from the reader/writer 160 and matches the received information against the information about the common encryption key held in the non-contact IC chip 150 (S112). Then, the non-contact IC chip 150 transmits a result of the matching to the reader/writer 160 (S114). It should be noted that the information about the common encryption key may be the key value itself of that common encryption key or the information accessible to the common area if the key values of the reader/writer 160 and the non-contact IC chip 150 are found to be the same. In what follows, this matching processing is also referred to as cross-certification processing.

Receiving the information matching result from the non-contact IC chip 150 about the common encryption key, the reader/writer 160 determines whether or not the common encryption key authentication has been successful (S116). If the common encryption key authentication is found failing, then the reader/writer 160 notifies the financial terminal control block 176 of the failure of the authentication, thereby ending this non-contact IC transaction. On the other hand, if the common encryption key authentication is found successful, then the reader/writer 160 starts reading the common area information (S118). First, the reader/writer 160 transmits a response request for common area information to the non-contact IC chip 150 (S120).

Receiving the response request of the common area information from the reader/writer 160, the non-contact IC chip 150 transmits the requested common area information to the reader/writer 160 (S122, S124). In step S124, the common area information to be transmitted may be encrypted by a predetermined encryption algorithm. The common area information may include encryption type information, so that the reader/writer 160 may decrypt the encrypted common area information on the basis of that encryption type information. Also, the reader/writer 160 may separately hold the information about that encryption. In this case, an encryption key necessary for that decryption may be generated along with the separately held information.

Receiving the common area information from the non-contact IC chip 150, the reader/writer 160 stores the received common area information into the storage block 172 (S126). As described before, this common area information includes the area code corresponding to each individual area and an individual encryption key. This area code may have a priority flag indicative of the priority of each financial card. When the received common area information has been stored, the reader/writer 160 transmits a common area information read completion notice to the financial terminal control block 176 (S128, S130).

Having received the common area information read completion notice from the reader/writer 160, the financial terminal control block 176 completes the reading of the common area information (S132).

Thus, the financial card system practiced as one embodiment of the invention executes the common area authentication on the basis of a common encryption key and then stores the common area information from the non-contact IC chip 150 into the financial terminal control block 176 of the reader/writer 160. The following describes the processing flow of obtaining individual area information by use of an individual encryption key included in the individual area information.
(Individual Area Authentication)

The following describes a process of obtaining individual area information by use of the common area information obtained after common area authentication.

Figure 8:
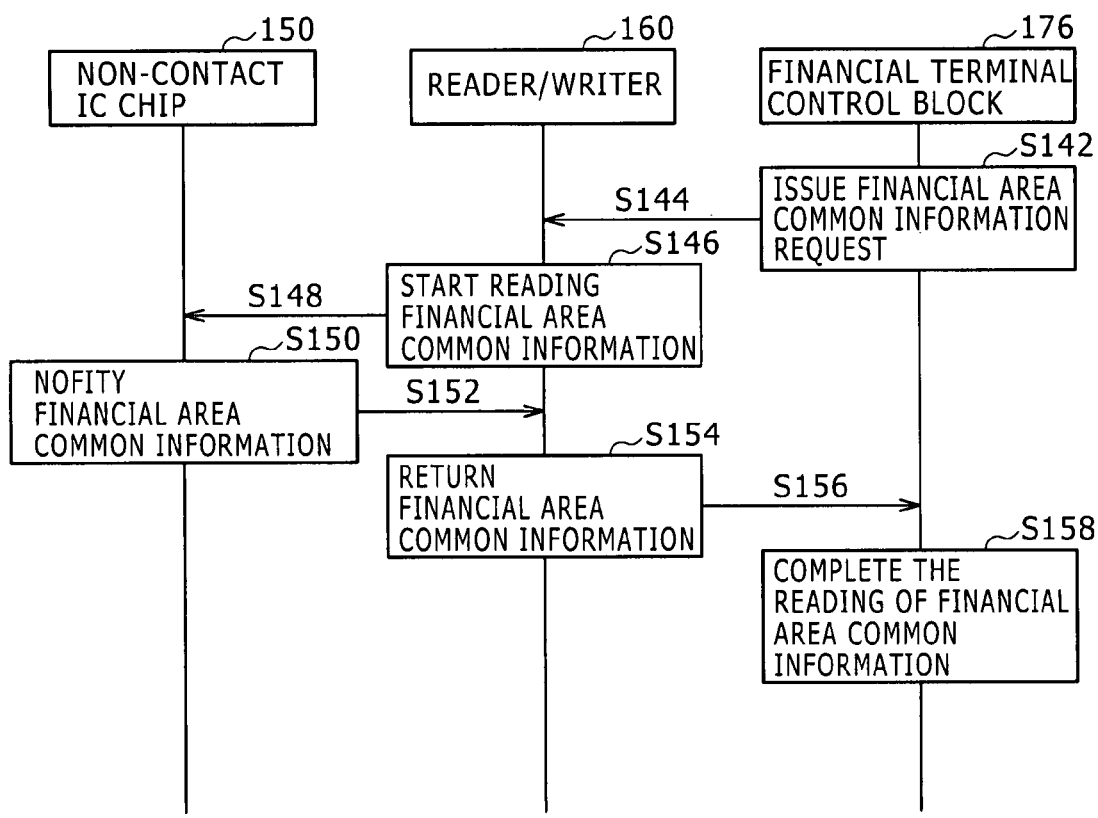
FIG. 8 is a sequence diagram indicative of processing of reading financial area common information practiced as the above-mentioned embodiment of the present invention.

First, the process of obtaining common information of individual area information with reference to FIG. 8. As described before in the description of the data configuration of the financial card area (1) 144, the individual area information is made up of the area data necessary for the authentication based on an individual encryption key and the common information that does not require the authentication. The following describes a process in which the financial terminal control block 176 reads financial area common information that is a specific example of the common information.

First, the financial terminal control block 176 issues a command to request the non-contact IC chip 150 for financial area common information (hereafter referred to as a financial area common information request) (S142) and sends the financial area common information request to the reader/writer 160 (S144). The financial area common information may include the information whether or not there is a financial card, the name of financial card, and the type of permitted transaction, for example.

Receiving the financial area common information request from the financial terminal control block 176, the reader/writer 160 starts reading the financial area common information (S146) and transmits the financial area common information request to the non-contact IC chip 150 (S148).

Receiving the financial area common information request from the reader/writer 160, the non-contact IC chip 150 reads the financial area common information from the storage block 172 and transmits this information to the reader/writer 160 (S150, S152).

Receiving the financial area common information from the non-contact IC chip 150, the reader/writer 160 transmits the financial area common information to the financial terminal control block 176 (S154, S156). It should be noted that the financial area common information may include an area code, a financial card name, information whether or not there is a card, the type of permitted transaction, and read results, for example. Also, the financial area common information may be encrypted in process S152 in which the financial area common information is transmitted from the non-contact IC chip 150 to the reader/writer 160.

The financial terminal control block 176 receives the financial area common information from the reader/writer 160 and completes the processing of reading the financial area common information.

Thus, of the individual area information, the common information is not subjected to the authentication processing based on an individual encryption key, so that the processing of the common information is simple. Therefore, classifying the information that is low in security level into common information for not being subjected authentication processing is capable of enhancing the speed of the entire transactional processing.

Figure 9:
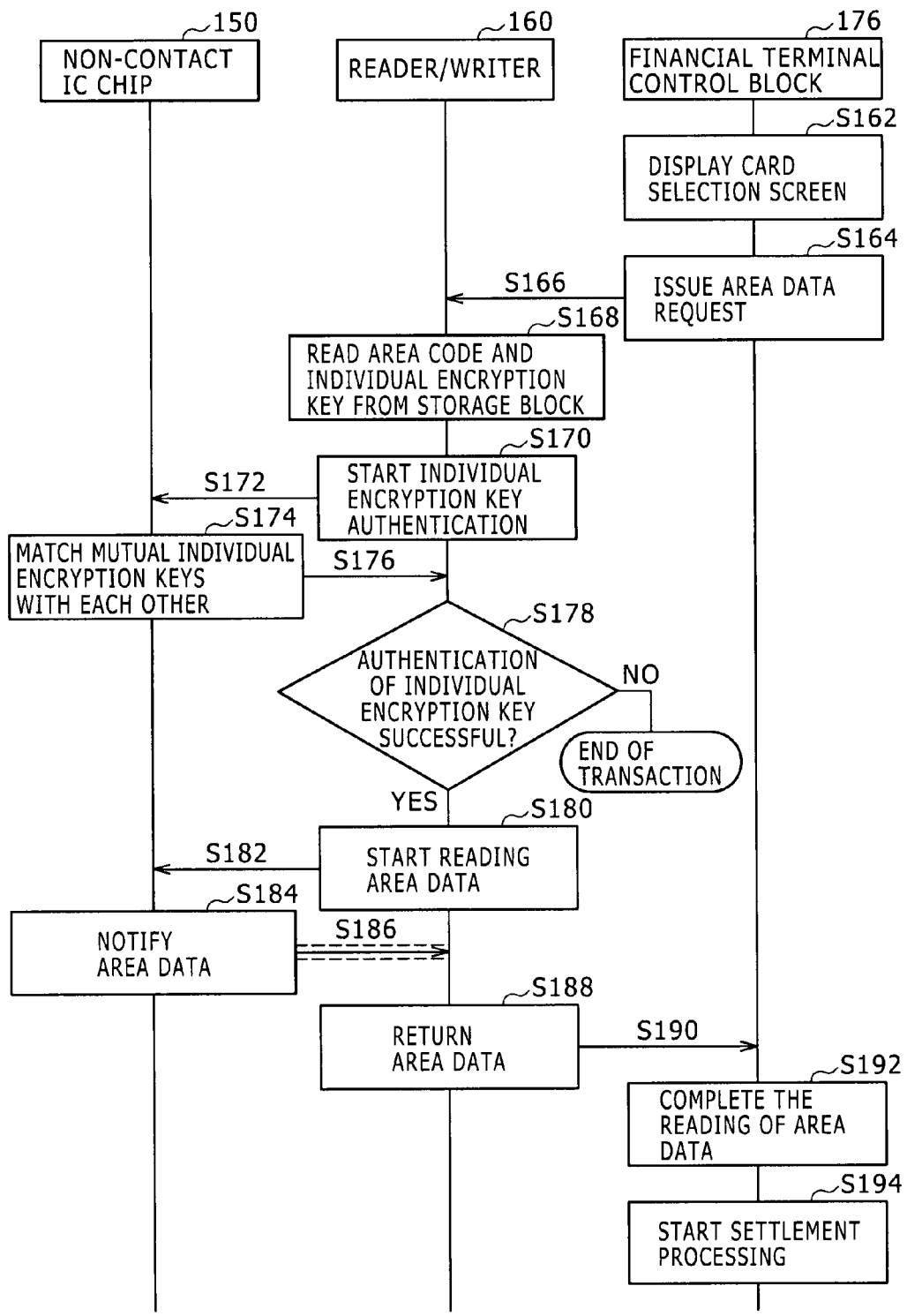
FIG. 9 is a sequence diagram indicative of processing of reading area data practiced as the above-mentioned embodiment of the present invention.

The following describes the processing of obtaining the area data that must be authenticated on the basis of an individual encryption key, of the individual area information, with reference to FIG. 9.

First, on the basis of the common information obtained through the above-mentioned process, the financial terminal control block 176 displays the types of registered financial cards and so on the screen to let the user select the type of the card to be used for transaction (S162). The information to be displayed here includes the names of card available for a transaction to be made and the type of transaction, for example. When one of the financial card types is selected by the user, then the financial terminal control block 176 issues a command to request the non-contact IC chip 150 for area data (hereafter referred to as an area data request) (S164) and transmits the issued command to the reader/writer 160 (S166).

Receiving the area data request from the financial terminal control block 176, the reader/writer 160 reads the area code and the individual encryption key from the storage block 172 (S168). Then, the reader/writer 160 starts the authentication processing on the basis of that individual encryption key (S170). Next, the reader/writer 160 transmits the information about the individual encryption key to the non-contact IC chip 150 (S172).

Receiving the information about the individual encryption key from the reader/writer 160, the non-contact IC chip 150 matches the information about the individual encryption key held in the non-contact IC chip 150 against the received information about the individual encryption key (S174). Then, the non-contact IC chip 150 transmits a result of the matching to the reader/writer 160 (S176).

The reader/writer 160 receives the result of the matching about the individual encryption key from the non-contact IC chip 150 and determines whether the authentication of the individual encryption key has been successful or not (S178). If the authentication is found failing, then the reader/writer 160 transmits the result of the authentication to the financial terminal control block 176, thereby ending the transaction concerned. On the other hand, if the authentication is found successful, then the reader/writer 160 starts reading the area data (S180). The reader/writer 160 transmits an area data response request to the non-contact IC chip 150 (S182).

Receiving the area data response request from the reader/writer 160, the non-contact IC chip 150 reads the area data from the storage block 140 and transmits the read area data to the reader/writer 160 (S184, S186). It should be noted that the area data may be encrypted in process S186. In this case, the above-mentioned encryption may use the encryption algorithm for encrypting the individual encryption key.

Receiving the area data from the non-contact IC chip 150, the reader/writer 160 transmits the received area to the financial terminal control block 176 as a response to the area data request (S188, S190).

Receiving the area data from the reader/writer 160, the financial terminal control block 176 completes the processing of reading area data (S192). Then, the financial terminal control block 176 starts settlement processing on the basis of the received area data (S194). For example, the financial terminal control block 176 may transmit the financial card information of the user based on the received area data and the transactional information previously entered by the user to the host computer to make the host computer match these times of information against the account information and so on of the host computer, thereby executing settlement processing on the basis of a result of this matching.

As described above, the financial data system practiced as one embodiment of the invention provides a mechanism in which, on the basis of the individual area authentication using the individual encryption key stored in the storage block 172 of the reader/writer 160, the area data held in the non-contact IC chip 150 is transmitted to the financial terminal control block 176. This novel configuration allows the financial terminal control block 176 to securely read the area data that is important information from the non-contact IC chip 150.

(Transaction End Processing)

Figure 10:
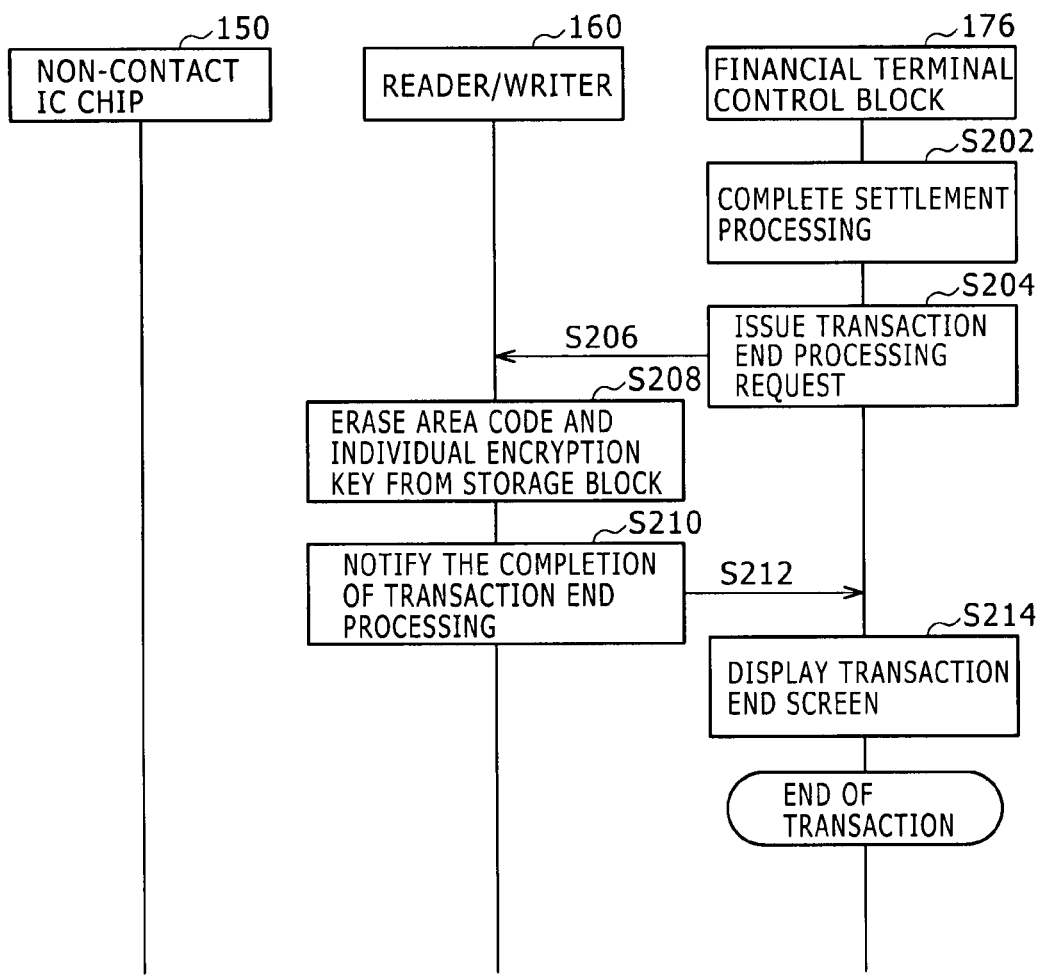
FIG. 10 is a sequence diagram indicative of transaction end processing practiced as the above-mentioned embodiment of the present invention.

The following describes processing of ending transaction with reference to FIG. 10.

First, upon completion of settlement processing (S202), the financial terminal control block 176 issues a command to request the reader/writer 160 to end the transaction (hereafter referred to as a transaction end processing request) (S204) and transmits the transaction end processing request to the reader/writer 160 (S206).

Receiving the transaction end processing request from the financial terminal control block 176, the reader/writer 160 deletes the area code and the individual encryption key from the storage block 172 (S208). Upon completion of this deletion, the reader/writer 160 notifies the financial terminal control block 176 of the completion of the transaction end processing (S210, S212).

Receiving the notification of the completion from the reader/writer 160, the financial terminal control block 176 displays a transaction end screen on the display block (S214), thereby ending the transaction concerned.

Thus, the common area information stored in the reader/writer 160 is completely deleted therefrom after the completion of settlement processing and upon request from the financial terminal control block 176. Therefore, the common area information including the individual encryption key is stored in the storage block 172 of the reader/writer 160 only while transaction processing is executed. As a result, the security in the management of individual encryption keys can be ensured and the load of key management on the side of the reader/writer 160 can be mitigated.

<Registering a Common Area Into Non-Contact IC Chip 150>

Figure 11:
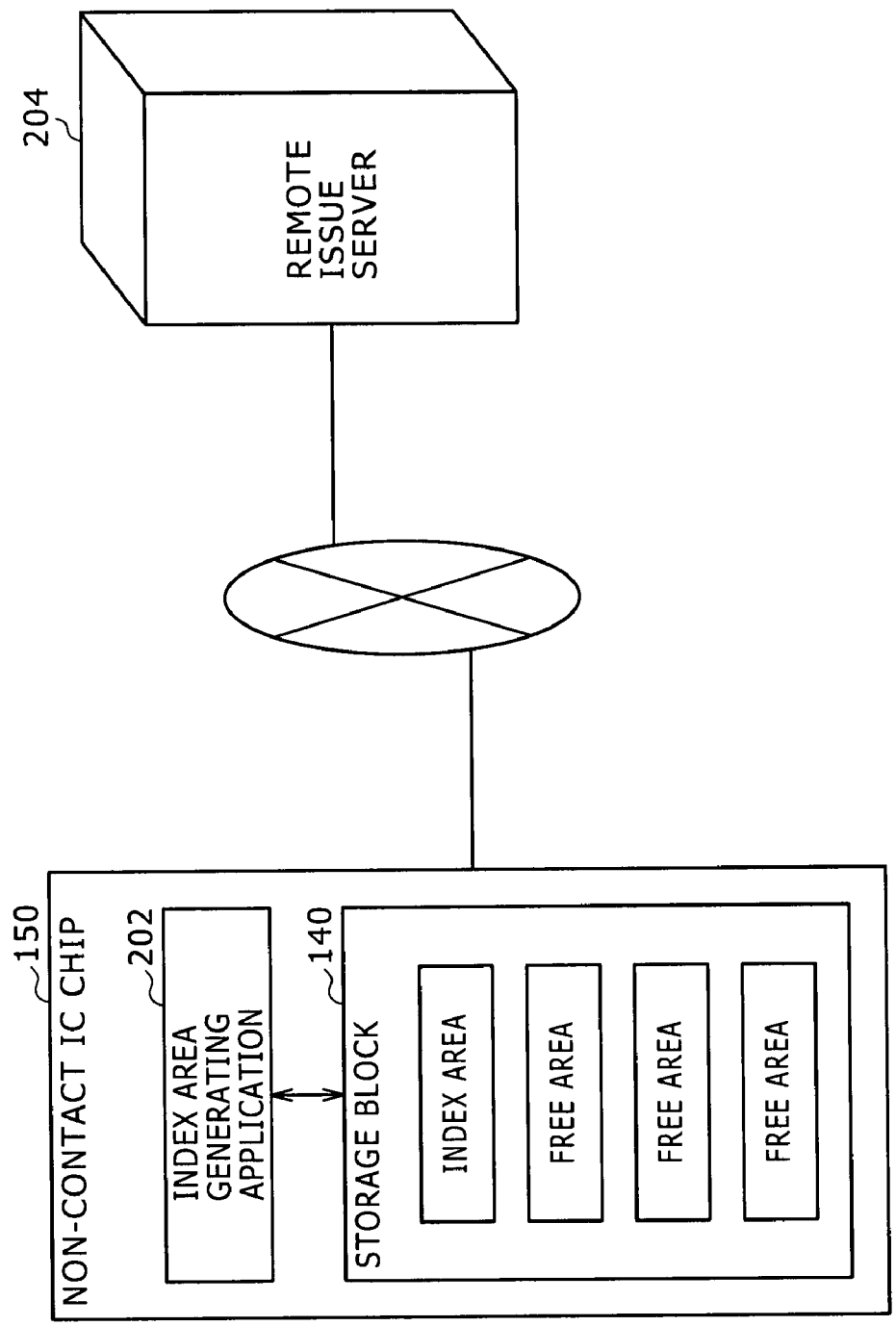
FIG. 11 is a block diagram illustrating an exemplary system configuration for generating an index area practiced as the above-mentioned embodiment of the present invention.

In the above, the description has been made on the assumption that the index area 142 and the financial card areas 144, 146, and 148 have been registered in the non-contact IC chip 150 in advance. In what follows, a method of registering the index area 142 that is a specific example of the common area into the non-contact IC chip 150 with reference to FIG. 11. FIG. 11 is a conceptual diagram illustrating how to register the index area 142 into the non-contact IC chip 150. Therefore, the execution of this registration processing requires at least the components shown in FIG. 2.

Referring to FIG. 11, the non-contact IC chip 150 has an index area generating application 202 and the storage block 140. The index area generating application 202 may be a program that is downloaded by the user from a predetermine server called a download site on a network, for example. In this case, the downloaded program is stored in the storage block 140 or the RAM 130. On the other hand, the index area generating application 202 may be stored in the ROM 128 of the non-contact IC chip 150 in advance by the manufacturer thereof, for example. In any case, the index area generating application 202 is configured to provide the function thereof through the processing executed by the CPU 126. The non-contact IC chip 150 is connected to a remote issue server 204.

In consideration of the above-mentioned configuration, the following briefly describes a method of generating the index area. (a) First, the index area generating application 202 transmits an index area generating request command to the remote issue server 204 through the communications block 124. (b) The remote issue server 204 generates the index area for the non-contact IC chip 150. (c) When the index area has been generated, the remote issue server 204 transmits a notice of the completion of the index area generation to the index area generating application 202. The method of generating the index area has been described so far. The above-mentioned method characterized by that the remote issue server records different IC chip codes for different non-contact IC chip in generating the index area. As a result, if a plurality of non-contact IC chips are installed on the communications device 102, the IC chips can be identified from each other.

<Registering Method of an Individual Area Into Non-Contact IC Chip 150>

Figure 12:
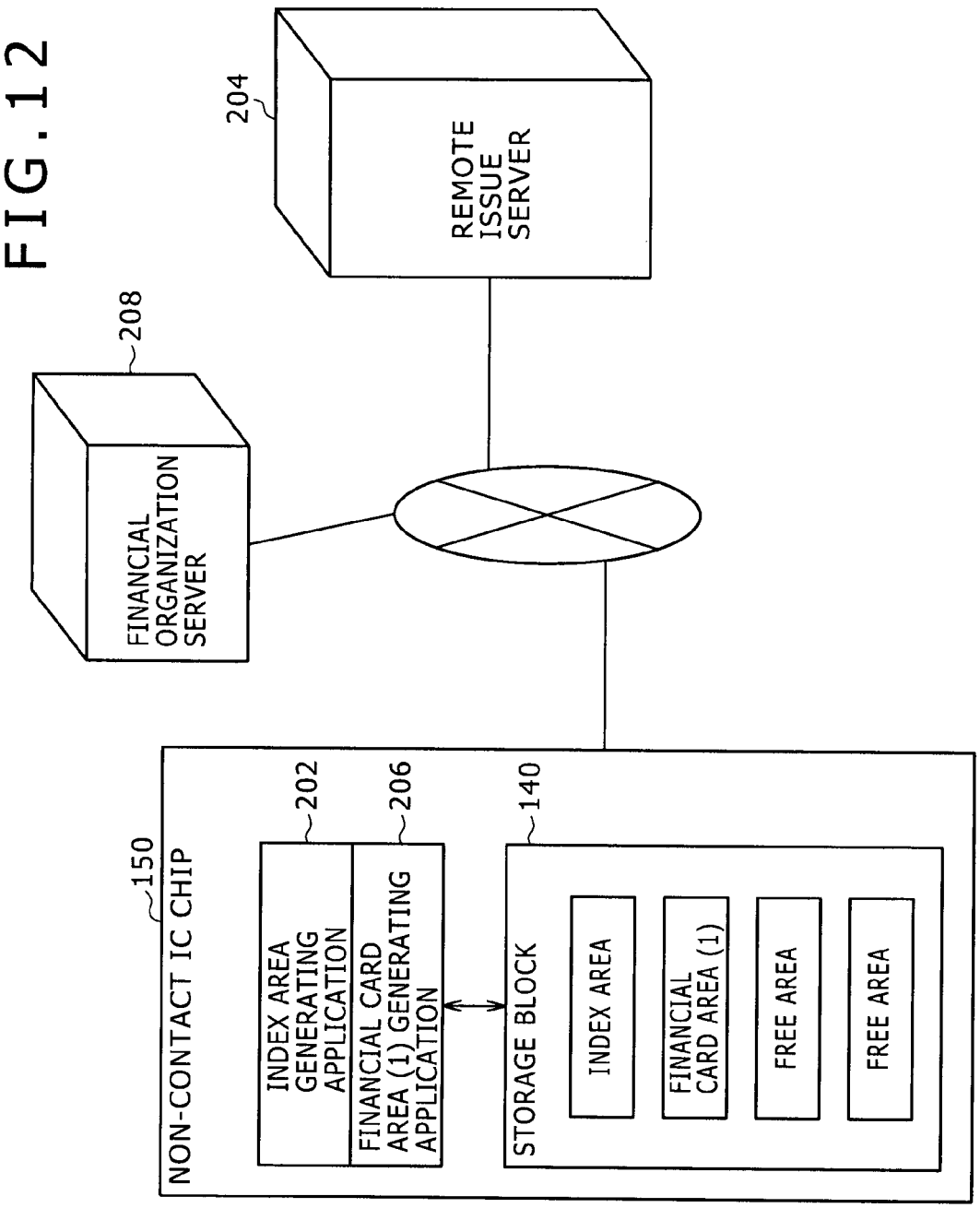
FIG. 12 is a block diagram illustrating an exemplary system configuration for generating a financial card area practiced as the above-mentioned embodiment of the present invention.

The following describes a method of generating the financial card area (1) 144 that is a specific example of the individual area, with reference to FIG. 12. It should be noted that the description already made above with respect to the method of generating the index area will be omitted and only the different point will be described.

Referring to FIG. 12, the non-contact IC chip 150 further has a financial card area (1) generating application 206. The non-contact IC chip 150 is connected to a financial organization server 208 through a network.

In consideration of the above-mentioned configuration, the following briefly describes a method of generating a financial card area (1). (a) The financial card area (1) generating application 206 checks whether there is an index area in the non-contact IC chip 150. If no index area is found, then the non-contact IC chip 150 ends the financial card area (1) generating application 206 or starts up the index area generating application 202 to generate an index area. (b) If an index area is found in (a), then the non-contact IC chip 150 specifies a predetermined area to write financial card information thereto. To do so, the non-contact IC chip 150 issues a command (hereafter referred to as a write card number request) for requesting a write card number corresponding to the desired financial card information to the financial organization server 208. (c) In accordance with the write card number request received from the non-contact IC chip 150, the financial organization server 208 transmits the card number of the financial card and so on to the non-contact IC chip 150. (d) The financial card area (1) generating application 206 transmits the card number and so on received from the financial organization server 208 to the remote issue server 204. In response, the remote issue server 204 generates the financial card area (1) in the storage block 140 of the non-contact IC chip 150 and writes the information such as the card number and so on to the financial card area (1). In this process is referred to as area registration. The information to be written by the remote issue server 204 to the financial card area (1) in the area registration includes card name and transactional type, for example, in addition to the above-mentioned card number. Further, when these items of information have been written, the financial card area (1) gets in a state where the minimum required information for functioning as a financial card has been written, so that the information whether there is a card or not is set to the card present state. (e) When the above-mentioned processes (a) through (d) have been completed, the non-contact IC chip 150 writes the area code and the key value of the individual encryption key corresponding to the financial card area (1) to the index area.

As described above, as far as the storage block 140 has any free area, the non-contact IC chip 150 is capable of generating a financial card area. In addition, the non-contact IC chip 150 records the area code and the key value of the individual encryption key corresponding to each generated financial card area to the index area.

It should be noted that the area code and the individual encryption key corresponding to each financial card area may be encrypted in accordance with a predetermined encryption algorithm in the index area. In this case, the IC chip code unique to the non-contact IC chip may be used for encryption. Namely, the encryption key that is generated in this encryption may include the information about the IC chip code. This configuration prevents any third parties who have illegally obtained the individual encryption key for accessing the financial card area from accessing by using the individual encryption key the information stored in the index area and financial card area of other non-contact IC chips. Consequently, the financial card system can be operated with significantly enhanced security.

While preferred embodiments of the present invention have been described using specific terms, such description is for illustrative purpose only. It is obvious that changes and variations may be made by those skilled in the art without departing from the gist of claims. Therefore, the changes and variations are understood to be contained in the spirit or scope of the claims that follow.

For example, in the above-mentioned embodiments, the description has been made mainly by use of financial cards issued by financial organizations as a target. Obviously, the present invention is not restricted to these embodiments. For example, the non-contact IC cards may also be non-contact IC cards for use in ticket examination services in public transport and for use in payment at retailing stores and restaurants. In other words, the information described as the term of financial card information may be issued other than financial organizations and the contents of transaction made by use of that information are not restricted to financial transaction. For example, the financial card information may be the ticket information in public transport, the log of entrance and exit management of theaters and other entertainment facilities, and meal expenses at restaurants. Namely, if the security level currently required for financial transaction is also required in other transactional information in the future, the configuration of the non-contact IC chip, the configuration of the reader/writer, and the configuration of the authentication terminal, all practiced as preferred embodiments of the invention, are applicable to the components of each system that handles the above-mentioned transactional information.

What is claimed is:

1. A financial card system comprising:
    a communications device having a non-contact integrated circuit chip; and
    an authentication terminal having a reader/writer and communicating with the communications device,
    wherein the communications device further comprises:
        a device storage block that is included in the non-contact integrated circuit chip having:
            an individual area that stores financial card information of a plurality of financial organizations and that is accessible by use of an individual encryption key unique to said each of the plurality of financial organizations, and
            a common area that stores a plurality of individual encryption keys, each of which being unique to said each of the plurality of financial organizations, and that is accessible by use of a common encryption key recorded to said reader/writer,
        a common area information transmission block that transmits said individual encryption key from said common area to said reader/writer when said common area is accessed by said reader/writer by use of said common encryption key, and
        an individual area information transmission block that transmits said financial card information from said individual area to said reader/writer when said individual area is accessed by said reader/writer by use of said individual encryption key,
    wherein said reader/writer of said authentication terminal comprises:
        a reader/writer storage block that stores said common encryption key for accessing said common area in said device storage block of said communications device,
        a common area information reception block that receives said individual encryption key from said common area by accessing said common area of said device storage block of said communications device by said common encryption key, and
        an individual area information reception block that receives said financial card information from said individual area by accessing said individual area of said device storage block of said communications device by said received individual encryption key,
        wherein during a transmission of the individual encryption key between the communication device and the authentication terminal, the individual encryption key is encrypted using a combination of a chip code of the non-contact integrated circuit chip with a terminal key of the authentication terminal or an area code.

2. The financial card system according to claim 1, wherein said device storage block of said communications device has an individual area that stores financial card information for each financial card registered by a user and that is accessible by use of an individual encryption key unique to said each financial card instead of said individual area to which financial card information is recorded for each financial organization and which is accessible by use of an individual encryption key unique to said each financial organization.

3. An authentication method of providing authentication between a communications device and an authentication terminal, wherein the communication device has an individual area storing financial card information for a plurality of financial organizations and being accessible by use of an individual encryption key unique to said each of the plurality of financial organizations and a common area storing an individual encryption key for said each of the plurality of financial organizations, wherein the authentication terminal has a non-contact integrated circuit chip reader/writer that holds a common encryption key necessary for accessing said common area and that transmits and receives information with said communications device through said reader/writer, said authentication method comprising the steps of:

transmitting said individual encryption key from said common area to said non-contact integrated circuit chip reader/writer through said communications device when said common area is accessed by said reader/writer by said common encryption key;

receiving said individual encryption key through said communications device by said non-contact integrated circuit chip reader/writer;

transmitting said financial card information from said individual area to said non-contact integrated circuit chip reader/writer through said communications device when said individual area is accessed by said non-contact integrated circuit chip reader/writer by said received individual encryption key; and receiving said financial card information through said communications device by said non-contact integrated circuit chip reader/writer, wherein during the transmission of the individual encryption key between the communication device and the authentication terminal, the individual encryption key is encrypted using a combination of a chip code of the non-contact integrated circuit chip of the communication device with a terminal key of the authentication terminal or an area code.

* * * * *